United States Patent
Papp et al.

(10) Patent No.: US 10,990,505 B2
(45) Date of Patent: Apr. 27, 2021

(54) STIPULATED OVERRIDES WITH VIOLATION RESOLUTION

(71) Applicant: DreamWorks Animation LLC, Glendale, CA (US)

(72) Inventors: Esteban Papp, Trabuco Canyon, CA (US); Chi-Wei Tseng, San Mateo, CA (US); Stuart Bryson, Neutral Bay (AU); Matthew Christopher Gong, Pasadena, CA (US); Yu-Hsin Chang, Pasadena, CA (US)

(73) Assignee: DREAMWORKS ANIMATION LLC, Glendale, CA (US)

( * ) Notice: Subject to any disclaimer, the term of this patent is extended or adjusted under 35 U.S.C. 154(b) by 0 days.

(21) Appl. No.: 16/389,635

(22) Filed: Apr. 19, 2019

(65) Prior Publication Data

US 2020/0334127 A1 Oct. 22, 2020

(51) Int. Cl.
| | | |
|---|---|---|
| *G06T 11/60* | (2006.01) | |
| *G06F 11/36* | (2006.01) | |
| *G06F 3/0482* | (2013.01) | |
| *G06T 13/80* | (2011.01) | |

(Continued)

(52) U.S. Cl.
CPC ........ *G06F 11/3624* (2013.01); *G06F 3/0482* (2013.01); *G06F 8/36* (2013.01); *G06T 11/60* (2013.01); *G06T 13/40* (2013.01); *G06T 13/80* (2013.01); *G06T 2200/24* (2013.01)

(58) Field of Classification Search
None
See application file for complete search history.

(56) References Cited

U.S. PATENT DOCUMENTS

| 7,693,867 B2 | 4/2010 | Jensen et al. |
| 7,836,087 B1 | 11/2010 | Gregory et al. |

(Continued)

FOREIGN PATENT DOCUMENTS

EP     3246921 A2     11/2017

OTHER PUBLICATIONS

Cassell et al., BEAT: the Behavior Expression Animation Toolkit*, Dec. 2004, Springer-Verlag Berlin Heidelberg, 163-185 (Year: 2004).*

(Continued)

*Primary Examiner* — Robert J Craddock
(74) *Attorney, Agent, or Firm* — Lee, Hong, Degerman, Kang, Waimey

(57) ABSTRACT

A method for composing a scene using a data module includes: receiving, from a user, an instruction to instantiate the data module to produce at least a first instance of the data module in a second data module; receiving, from the user, a first override for modifying the first instance of the data module; receiving, from the user, a second override for modifying the data module; identifying a conflict introduced by the first override or the second override; configuring a display interface to display an indication informing the user of the identified conflict; configuring the display interface to display one or more options for resolving the identified conflict; receiving, from the user, a selection of an option of the one or more options; and in response to the selection of the option, resolving the identified conflict by deleting the first override or the second override.

17 Claims, 18 Drawing Sheets

(51) Int. Cl.
*G06T 13/40* (2011.01)
*G06F 8/36* (2018.01)

(56) References Cited

U.S. PATENT DOCUMENTS

| | | | | |
|---|---|---|---|---|
| 8,773,433 | B1* | 7/2014 | Smyrl | G06T 15/506 |
| | | | | 345/420 |
| 10,345,989 | B2* | 7/2019 | Da Costa | G06F 3/04815 |
| 2002/0130872 | A1* | 9/2002 | Novikova | G06T 13/00 |
| | | | | 345/473 |
| 2009/0322760 | A1* | 12/2009 | Kwiatkowski | G06T 13/00 |
| | | | | 345/473 |
| 2013/0120422 | A1* | 5/2013 | Rao | G06F 16/2246 |
| | | | | 345/581 |
| 2015/0379335 | A1* | 12/2015 | Marlow | G06F 3/011 |
| | | | | 382/203 |

OTHER PUBLICATIONS

Sun et al., Creative Conflict Resolution in Collaborative Editing Systems, Feb. 15, 2012, ACM, 1411-1420 (Year: 2012).*
European Patent Office Application Serial No. 19216053.9, Extended Search Report dated Feb. 19, 2020, 8 pages.
Dobos, et al., "3D Diff: An Interactive Approach to Mesh Differencing and Conflict Resolution," University College London, XP58010301A, Nov. 2012, 4 pages.

* cited by examiner

STIPULATED OVERRIDES WITH VIOLATION RESOLUTION

BACKGROUND

A computer-generated animation is typically created by rendering a sequence of images, with each image depicting a computer-generated scene composed of one or more computer-generated assets (e.g., a character, a group of characters, an environment, an effect, or a lighting rig). In a particular scene, an asset may include more than one instance of a same data module. For example, a scene may depict a human character having a left arm and a right arm. In this example, the left arm and the right arm are instances of a same data module (e.g., an arm module).

Overrides are a data management technique that allows for reuse of data modules. Overrides allow a user to edit a data module or an instance of the data module, to partially modify content thereof. These overrides are granular edits that allow the instance (or derivation) of a data module to be partially modified from the original.

SUMMARY

Conflicts may arise from processing one or more overrides. For example, a sequential combination of an override for modifying an instance of a data module and an override for modifying the data module itself may lead to one or more conflicts. According to one or more embodiments, it is expected that such conflicts can and will occur, during the course of using and reusing data modules According to embodiments of the present disclosure, such conflicts are identified and resolved. For example, upon identification (or detection) of such a conflict, a user is informed of the conflict, and the user is presented with one or more options for resolving the conflict.

Embodiments of the present disclosure may be directed to composing one or more scenes using a data module. Various embodiments may be used to not only compose a scene, but also to render images, to author characters, and/or to define pieces of scene internals (e.g., each and every piece of the scene internals), including data such as a character dependency graph, defining animation controls and curve values, etc. Various embodiments provide a feature-rich set of scene authoring and composition grammar that allows building of modular character and scene components. Being able to reference components and change (e.g., sparsely change) the component provides great flexibility and improves efficiency with a high level of reuse. Where embodiments provide an explicit override grammar, the number of conflicts that are detected may be increased. These conflicts can then be reported to the user, and the user is assisted in resolving the conflicts. According to embodiments of the present disclosure, conflict detection helps an animation artist to identify issues in his or her data, rather than silently ignoring such issues.

Embodiments of the present disclosure include systems, methods, and computer-readable media for composing a scene using a data module.

According to at least one embodiment, a method for composing a scene using a data module includes: receiving, from a user, an instruction to instantiate the data module to produce at least a first instance of the data module in a second data module; receiving, from the user, a first override for modifying the first instance of the data module; receiving, from the user, a second override for modifying the data module; identifying a conflict introduced by the first override or the second override; configuring a display interface to display an indication informing the user of the identified conflict; configuring the display interface to display one or more options for resolving the identified conflict; receiving, from the user, a selection of an option of the one or more options; and in response to the selection of the option, resolving the identified conflict by deleting the first override or the second override.

According to at least one embodiment, a machine-readable non-transitory medium storing machine-executable instructions for composing a scene using a data module is disclosed. The instructions include: receiving, from a user, an instruction to instantiate the data module to produce at least a first instance of the data module in a second data module; receiving, from the user, a first override for modifying the first instance of the data module; receiving, from the user, a second override for modifying the data module; identifying a conflict introduced by the first override or the second override; configuring a display interface to display an indication informing the user of the identified conflict; configuring the display interface to display one or more options for resolving the identified conflict; receiving, from the user, a selection of an option of the one or more options; and in response to the selection of the option, resolving the identified conflict by deleting the first override or the second override.

According to at least one embodiment, a system for composing a scene using a data module includes one or more controllers configured to: receive, from a user, an instruction to instantiate the data module to produce at least a first instance of the data module in a second data module; receive, from the user, a first override for modifying the first instance of the data module; receive, from the user, a second override for modifying the data module; identify a conflict introduced by the first override or the second override; configure a display interface to display an indication informing the user of the identified conflict; configure the display interface to display one or more options for resolving the identified conflict; receive, from the user, a selection of an option of the one or more options; and in response to the selection of the option, resolving the identified conflict by deleting the first override or the second override.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in the technological field of computer animation and other computer modeling applications that other embodiments may be utilized, and that structural, electrical, as well as procedural changes may be made without departing from the scope of the present invention. Wherever possible, the same reference numbers will be used throughout the drawings to refer to the same or similar parts.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

For descriptive purposes, throughout this disclosure, software, software modules, software objects, and the like may be described as performing various functions. One of ordinary skill in the art, however, will recognize that software may not actively perform any function and instead may include instructions that are executable on a computer processor. As such, although software may be described herein as performing a function, it should be appreciated that a computer processor or other computing device may typically perform those functions attributed herein to software modules or objects by executing computer instructions provided by the software modules or objects.

A computer-generated animation is typically created by rendering a sequence of images, each image depicting a computer-generated scene composed of one or more computer-generated assets. Light sources, materials, textures, and other visual effects may be associated with a computer-generated object to create a realistic visual appearance for the computer-generated scene. For purposes of this discussion, a computer-generated scene generally refers to the virtual space that may be filmed using a virtual camera, and may also be referred to generically as a scene.

Various embodiments are described below relating to producing digital content. Digital content may refer to parametric scene description data. Portions of the scene description data may be reused in multiple sites. Sites may refer to individual shots or groups of shots. Base data refers to asset definitions, such as for characters, environments, and lighting rigs. Modifications refer to alterations to be applied to scene description data.

Figure 1:
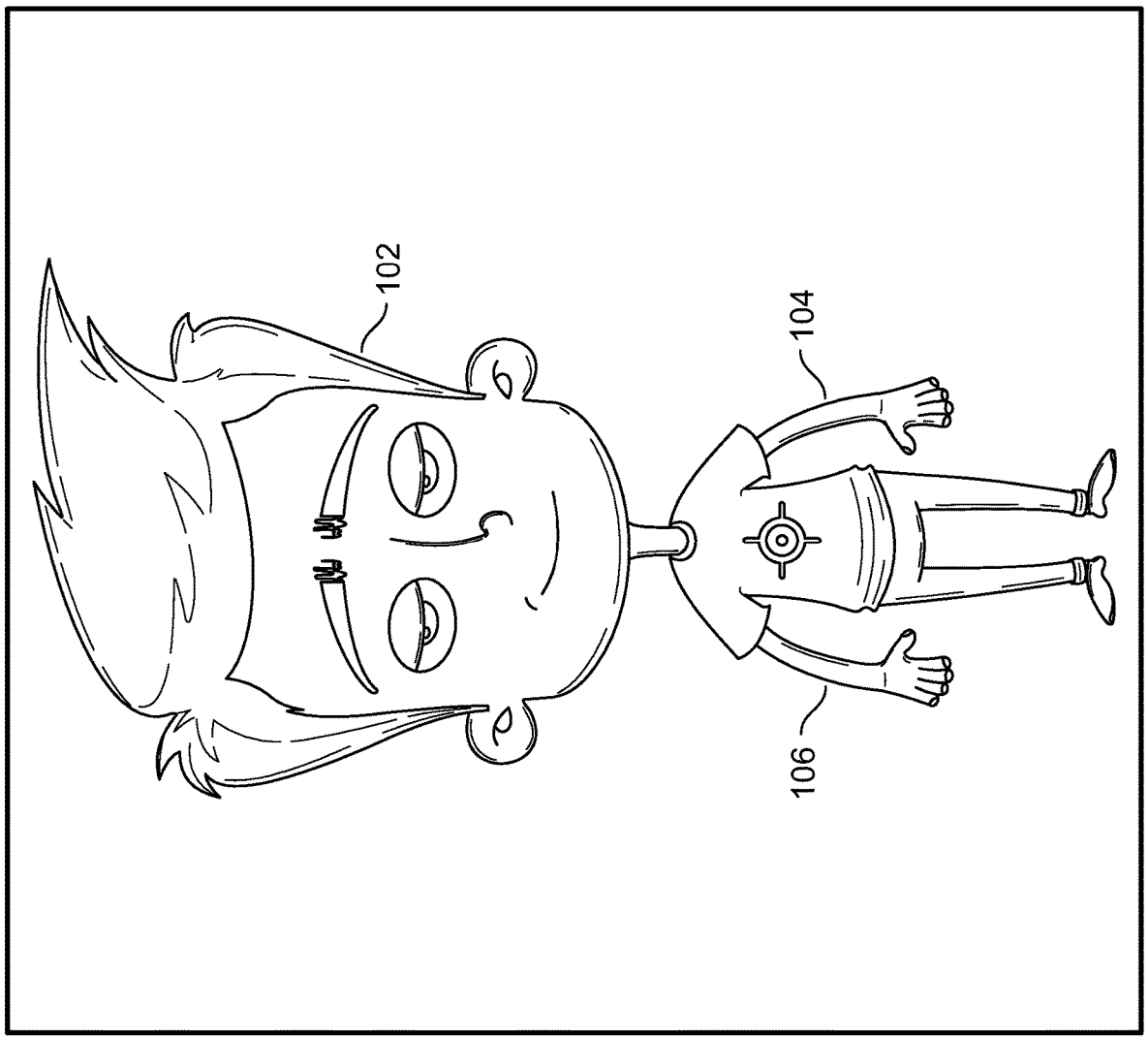
FIG. 1 depicts an example of a computer-generated image that may be rendered using sharing of data modules according to various embodiments

FIG. 1 depicts an example of a computer-generated image that may be rendered using sharing of data modules according to various embodiments. FIG. 1 illustrates an asset—a human character 102—depicted in a scene 100.

Using module-based data sharing, a particular data module can be efficiently used for one or more shots where visual characteristics of the data module may vary in a limited way based on one or more aspects. When the same data module is used as the base for producing a depiction of the asset in one or more shots, even a fundamental change to the data module, such as the addition of an object in the data module, may be readily applied to all shots where the asset is used. This speeds up production of animation and reduces computational complexity for rendering purposes.

For example, an arm module may be used to define an arm of the character 102. In this situation, the arm module may be instantiated two times in a body module for defining the body of the character 102: e.g., a first instance to define a left arm 104 of the character 102, and a second instance to define a right arm 106 of the character 102. The arm module may, by default, define an arm with a particular orientation—for example, an arm on a left side of the body of the character 102. In this situation, some attributes of the arm module may be changed in order to define the right arm 106. For example, regarding the second instance to define the right arm 106, an orientation attribute(s) of the arm module may be modified (e.g., reversed) so that the orientation of the right arm 106 matches that of an arm on a right side of the body of the character 102.

As described, modules may be defined, to be used as a base for producing various depictions. Each module may have one or more defined underlying objects that are included in the module. Each of the objects may have one or more attributes that are defined.

A particular module (e.g., an arm module) can be instantiated one or more times. For example, in a separate module (e.g., a body module), one or more instances of the particular module may be created. Each instance of the particular module will have (or include) any underlying objects that were included in the particular module.

Furthermore, modules may be edited—e.g., by a user. Overrides are a data management technique that allows for reuse of data modules. Data modules can reference other data models and instantiate the data multiple times, or be derived from the module. Once the data module is instanced or derived, a user can then apply a set of sparse edits, or overrides, over the instanced or derived data modules, to partially modify content of the data module. These overrides are granular edits that allow the instance or derivation to be partially modified from the original. For example, a particular instance can be edited to include one or more additional objects.

Conflicts may arise during the course of editing modules and/or instances. According to embodiments of the present disclosure, such conflicts are identified and resolved. For example, upon identification (or detection) of such a conflict, a user is informed of the conflict, and the user is presented with one or more options for resolving the conflict.

For purposes of illustration, particular embodiments will be described with respect to editing an instance of an arm module and editing the arm module itself. However, it is understood that features described can be applied to other different types of data modules.

Figure 2A:
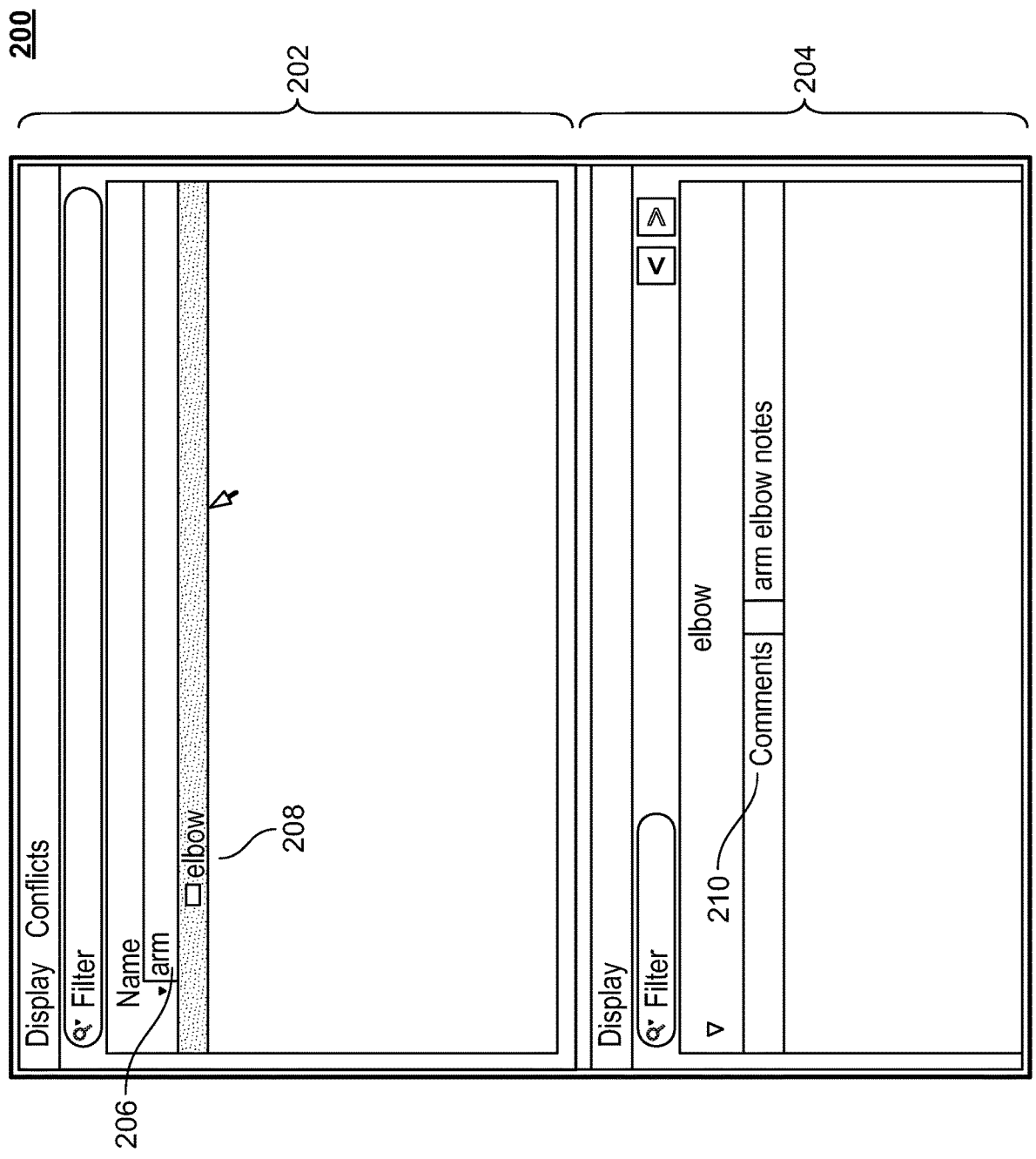
FIGS. 2A, 2B, 2C and 2D illustrate examples of a user interface according to at least one embodiment.

FIG. 2A illustrates an example of a user interface 200. The user interface 200 is configured to facilitate displaying properties of one or more modules and/or to facilitate editing properties of the modules.

The user interface 200 includes a display area 202 and a display area 204. The display area 202 displays a list of one or more objects that are in an arm module 206. As illustrated in FIG. 2A, the list includes an elbow object 208.

Attributes of an object or a data module are displayed in the display area 204. For example, in response to a selection of the elbow object 208 by a user, the display area 204 is configured to display attributes of the elbow object 208. As illustrated in FIG. 2A, the elbow object 208 has a Comments attribute 210. The value (or contents) of the Comments attribute 210 is "arm elbow notes." As such, the user is able to view the value of the Comments attribute 210 of the elbow object 208.

Figure 2B:
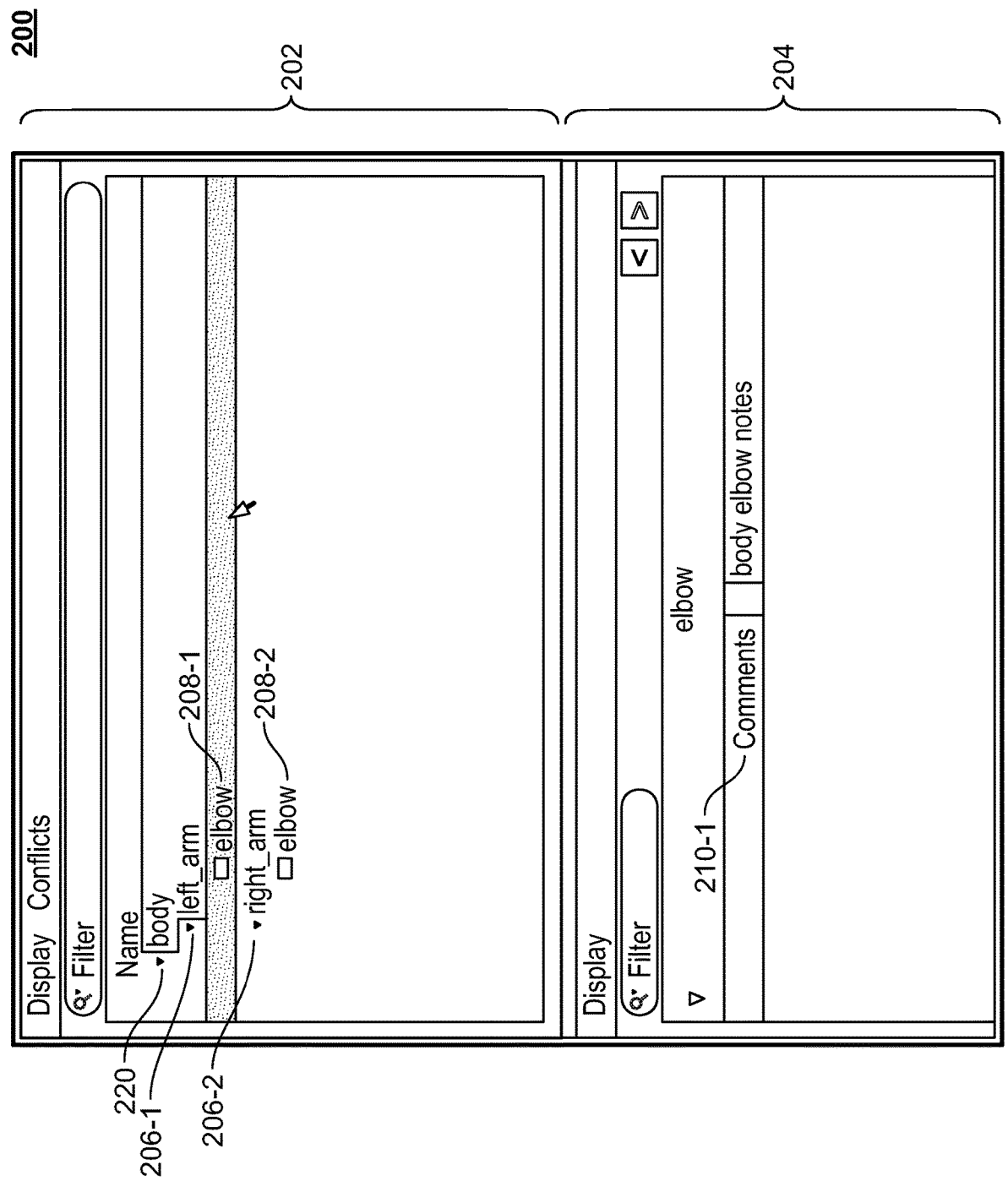

FIG. 2B illustrates a further example of the user interface 200. With reference to FIG. 2B, the arm module 206 may be instantiated one or more times. For example, in a separate module, one or more instances of the arm module may be created. As a particular example, in a body module 220 for defining a human body, two instances of the arm module 206 are created: a first instance 206-1 labeled as "left_arm" and a second instance 206-2 labeled as "right_arm."

Each instance 206-1, 206-2 of the arm module 206 includes (or contains), by default, any object(s) included in the arm module. As described earlier with reference to FIG. 2A, the arm module 206 has an underlying elbow object 208. Therefore, each instance 206-1, 206-2 of the arm module 206 includes the elbow object 208. With reference to FIG. 2B, the display area 202 lists an elbow object 208-1 as being included in the instance 206-1, and lists an elbow object 208-2 as being included in the instance 206-2.

In addition, each instance 206-1, 206-2 of the arm module 206 includes, by default, values of attributes of the elbow object 208 that have been defined. As described earlier with reference to FIG. 2A, the elbow object 208 has a Comments attribute 210 having a value of "arm elbow notes." Accordingly, each instance 206-1, 206-2 of the arm module 206 includes this value of the Comments attribute 210 of the elbow object 208.

For example, in response to a selection of the elbow object 208-1 by the user, the display area 204 is configured to display attributes of the elbow object 208-1. As illustrated in FIG. 2B, the elbow object 208-1 has a Comments attribute 210-1 having a value of "arm elbow notes." The same attribute value would be displayed in response to a selection of the elbow object 208-2 by the user.

After the arm module has been instantiated in the body module, the user can then apply a set of sparse edits, also referred to as overrides, over an instanced or a derived data module, e.g., to partially and locally modify content of the data module. The edits are local in the sense that the edits are localized to a particular instance. For example, the user may apply an edit to the instance 206-1 of the arm module 206. In this situation, the edit is local to the instance 206-1, and does not apply more globally. For example, the edit does not apply to the arm module 206, or to other instances of the arm module 206 (e.g., the instance 206-2).

Figure 2C:
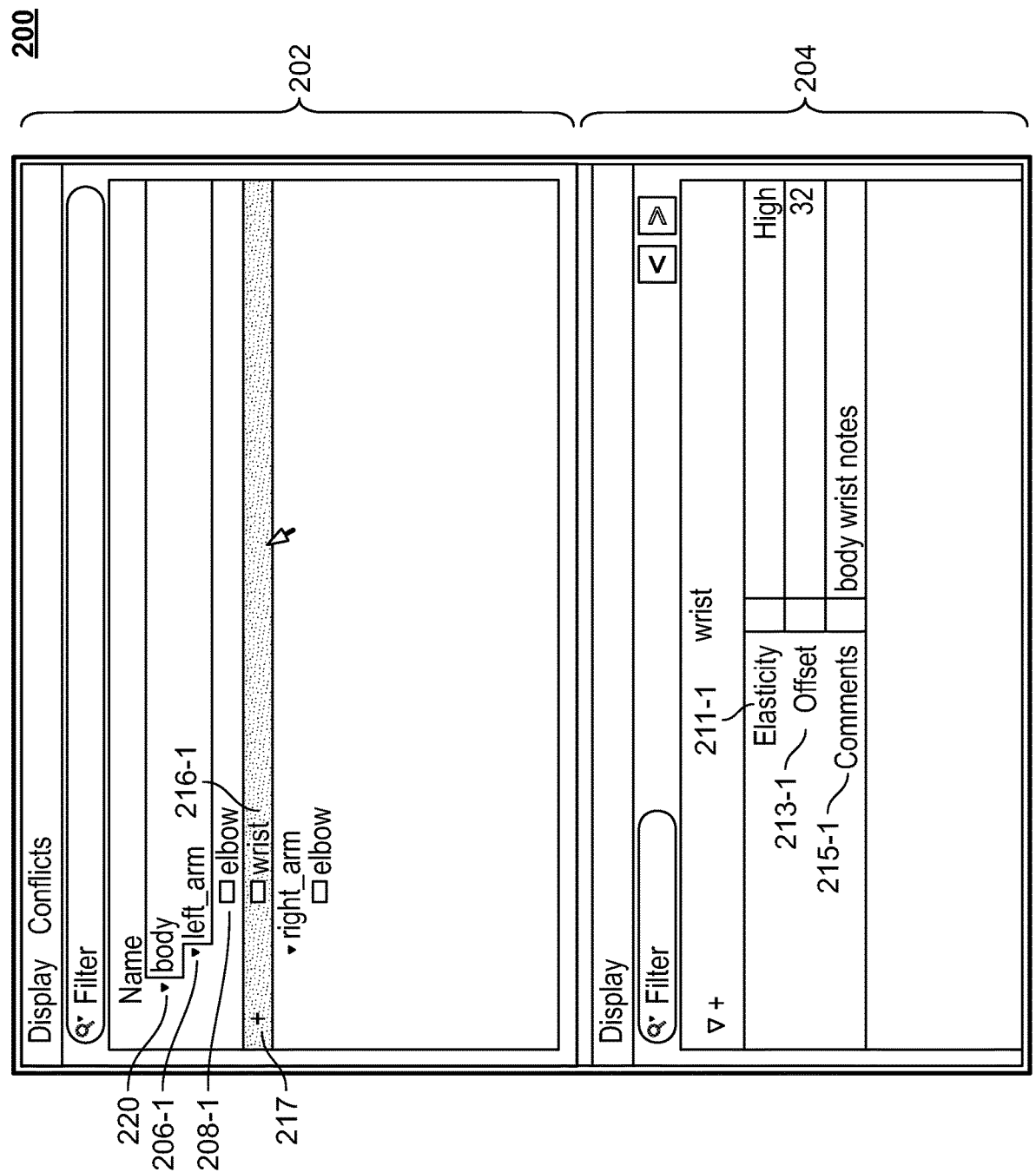

With continued reference to FIG. 2B, the body module 220 may be edited such that the instance 206-1 ("left_arm") includes a wrist object 216-1 in addition to the elbow object 208-1. FIG. 2C illustrates a further example of the user interface 200. As illustrated in FIG. 2C, the instance 206-1 has an underlying elbow object 208-1 and an underlying wrist object 216-1. Concurrent with editing the body module 220, values of attributes of the wrist object 216-1 may be defined. For example, with continued reference to FIG. 2C, the wrist object 216-1 is defined to have an Elasticity attribute 211-1 of High, an Offset attribute 213-1 of 32 and a Comments attribute 215-1 of "body wrist notes."

The user interface 200 may display an indicator 217 that indicates the addition of the wrist object 216-1 to the body module 220 (more specifically, to the instance 206-1 of the body module 220). For example, as illustrated in FIG. 2C, the indicator 217 may take the form of a "+" sign displayed adjacent to the wrist object 216-1.

Sequential application of one or more other overrides may introduce conflicts. For example, applying an additional override following the addition of the wrist object 216-1 to the body module 220 (see, e.g., FIG. 2C) may introduce one or more conflicts.

Figure 2D:
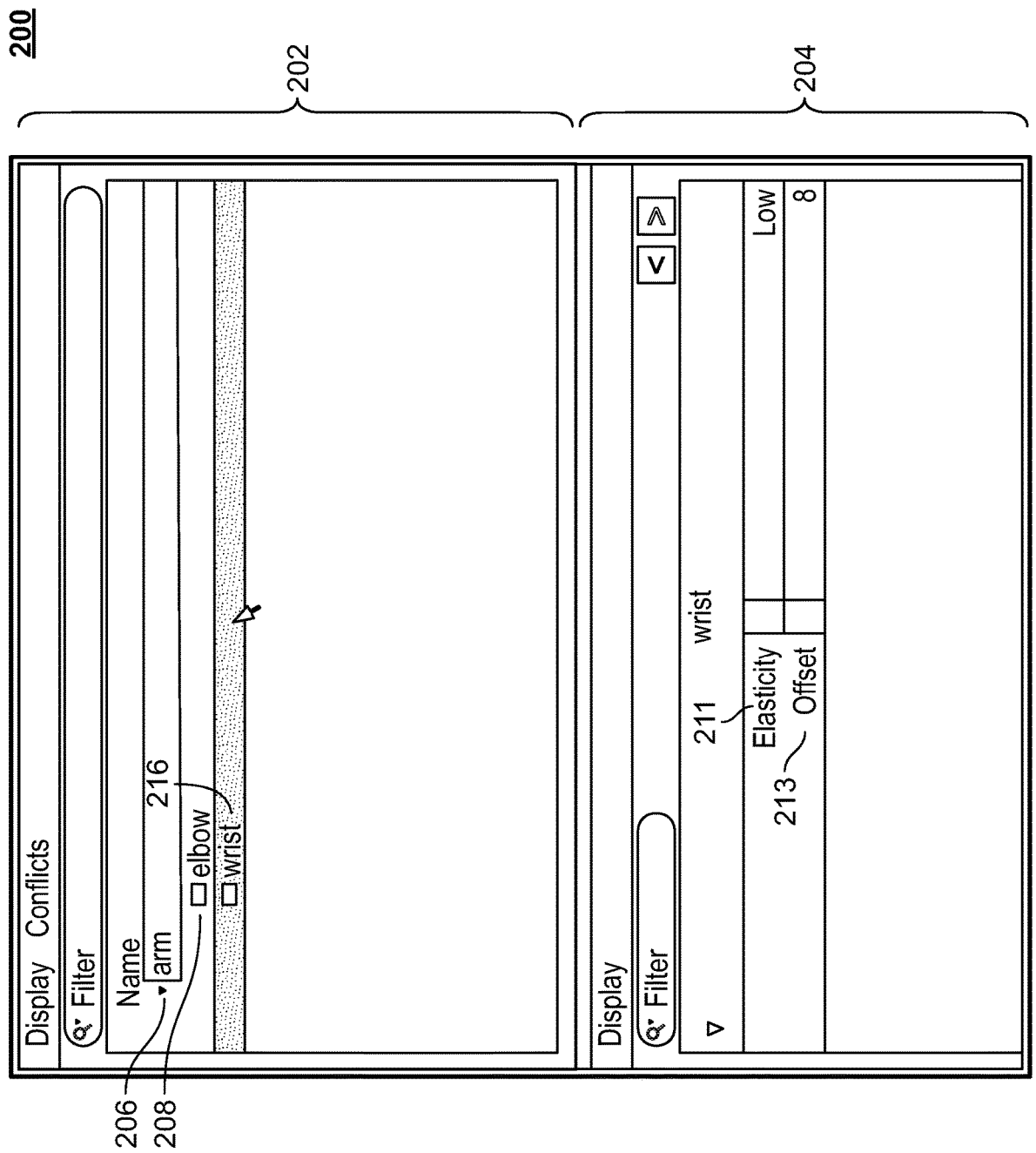

By way of example, the additional override may include an editing of the arm module 206 to include a wrist object 216, as well as the elbow object 208. FIG. 2D illustrates a further example of the user interface 200. As illustrated in FIG. 2D, the arm module 206 is edited to have not only the underlying elbow object 208 but also an underlying wrist object 216. Concurrent with editing the arm module 206, values of attributes of the wrist object 216 may be defined. For example, with continued reference to FIG. 2D, the wrist object 216 is defined to have an Elasticity attribute 211 of Low and an Offset attribute 213 of 8. Unlike the situation involving the wrist object 216-1 (see, e.g., FIG. 2C), a Comments attribute is not defined for the wrist object 216.

In this situation, a conflict arises. The editing of the arm module 206 to also include the wrist object 216 (as described with reference to FIG. 2D) introduces a conflict, in that the changes to the arm module 206 are, by default, included in any instances of the arm module 206 (e.g., the instances 206-1 and 206-2 of FIG. 2B) in the body module 220. However, as described earlier with reference to FIG. 2C, a same object (i.e., wrist object 216-1) was added to the body module 220. More specifically, the same object was added to the instance 206-1 of the body module 220. When the same object (i.e., wrist object 216) is added to the arm module 206, and this addition is, by default, included (or attempted to be included) in the instance 206-1, a conflict arises.

According to various embodiments, such a conflict is detected and/or identified. In this regard, the detection and/or identification of the conflict may be based on a matching of object names (e.g., "wrist object"). For example, if an object that is identified as "wrist object" is requested to be added to the arm module, then a conflict is detected because both the body module and the arm module are attempting to add an object that is identified as "wrist object." Alternatively (or in addition), the detection and/or identification may be based on a matching of unique identifiers (IDs) that allow objects to be identified even after an object is renamed. For example, a particular object may not be created (e.g., "from scratch"), but instead may be copied (e.g., from one module to another module). If the unique ID of the object is also copied, then the ID of the object remains associated with the object even if the name of the object is modified at a later time.

It is understood that detection of conflicts may be based on aspects other than identifiers. For example, a particular implementation may require that a scene include no more than one object having an Elasticity attribute of Low. If editing a module results in a scene having at least two objects having an Elasticity attribute of Low, then a conflict may be detected.

When the contents of the body module 220 are displayed at the user interface, the user interface may further display an indicator that informs the user of the detected/identified conflict. As will be described in more detail later, the user is thereby effectively informed that resolution of the conflict may be initiated and performed.

Figure 3:
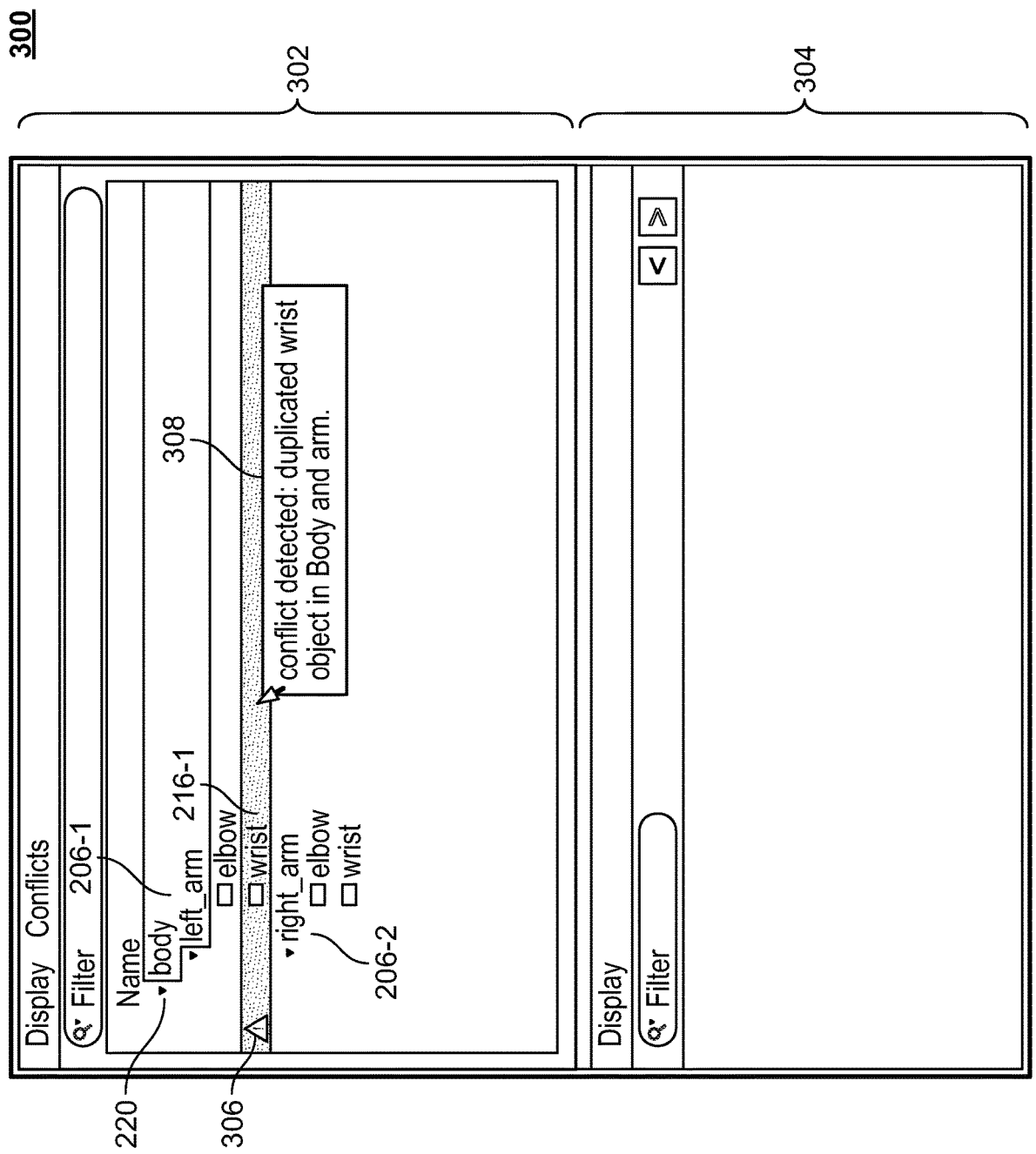
FIG. 3 illustrates an example of a user interface according to at least one embodiment.

For example, FIG. 3 illustrates an example of a user interface 300 having display areas 302 and 304. With reference to FIG. 3, an indicator 306 is displayed at the display area 302, adjacent to the wrist object 216-1 of the instance 206-1. The indicator 306 informs the user of the conflict, which is that the wrist object 216 (of the arm module 206) cannot be included in the instance 206-1, because the same object (wrist object 216-1) was added to the instance 206-1. In contrast, the wrist object 216 (of the arm module 206) can be included, by default, in the instance 206-2 (right_arm) of the body module 220 because no wrist object had been directly added to the instance 206-2.

Due to the conflict regarding the wrist object 216-1 of the instance 206-1—when the wrist object 216-1 is selected via the user interface 300, the display area 304 does not display values of attributes of the wrist object 216-1. Rather, when the user controls the user interface 300 to hover (e.g., via a pointer) over the wrist object 216-1, a message 308 is displayed at the user interface 300. The message 308 may describe the nature of the conflict that has arisen. For example, with reference to FIG. 3, the message 308 states: "conflict detected: duplicated wrist object in Body and arm."

According to various embodiments, one or more options for resolving the conflict are presented to the user via the user interface. For example, options for resolving the conflict are presented in a hierarchical manner. As described earlier with reference to FIG. 3, the indicator 306 is displayed adjacent to the wrist object 216-1. If the user further selects the wrist object 216-1 via the user interface (e.g., by right-clicking on the wrist object 216-1), a menu is presented to the user. The menu lists one or more options that are selectable by the user.

Figure 4A:
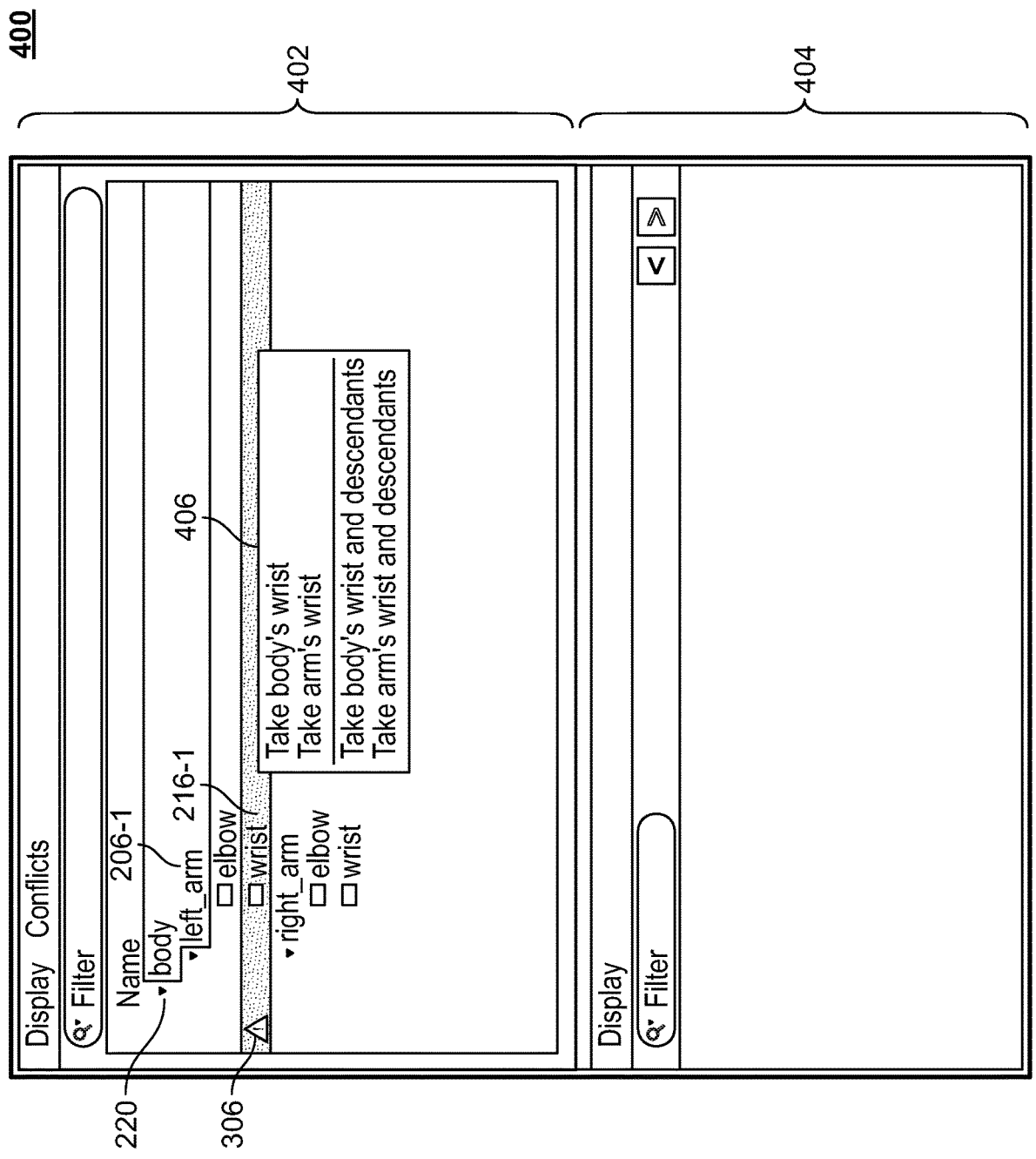
FIGS. 4A, 4B, 4C, 4D, 4E and 4F illustrate examples of a user interface according to at least one embodiment.

For example, FIG. 4A illustrates an example of a user interface 400 having display areas 402 and 404. With reference to FIG. 4A, if the user selects the wrist object 216-1 via the user interface 400 (e.g., by right-clicking on the wrist object 216-1), a menu 406 is displayed at the display area 402. The menu 406 lists four options that are selectable by the user: "Take body's wrist," "Take arm's wrist," "Take body's wrist and descendants," and "Take arm's wrist and descendants."

If the user selects the option "Take body's wrist" from the menu 406, then the instance of the wrist object 216-1 as was defined in association with the body module 220 (e.g., see FIG. 2C) is created. However, any attributes of the wrist object 216-1 defined in association with the body module 220 are not adopted in response to this selection.

If the user selects the option "Take arm's wrist" from the menu 406, then the instance of the wrist object 216 as was defined in association with the arm module 206 (e.g., see FIG. 2D) is created. However, any attributes of the wrist object 216 defined in association with the arm module 206 are not adopted in response to this selection.

If the user selects the option "Take body's wrist and descendants" from the menu 406, then the instance of the wrist object 216-1 as was defined in association with the body module 220 (e.g., see FIG. 2C) is created. In addition, edits involving descendants (e.g., any attributes of the wrist object 216-1 defined in association with the body module 220) are adopted by the created instance of the wrist object 216-1.

If the user selects the option "Take arm's wrist and descendants" from the menu 406, then the instance of the wrist object 216 as was defined in association with the arm module 206 (e.g., see FIG. 2D) is created. In addition, edits involving descendants (e.g., any attributes of the wrist object 216 defined in association with the arm module 206) are adopted by the created instance of the wrist object 216.

As described earlier—if the user selects the option "Take body's wrist" from the menu 406, then the wrist object 216-1 as was defined in association with the body module 220 is created. That is, the editing of the body module 220 to include the wrist object 216-1 in the instance 206-1 is accepted, and the instance 206-1 does not include the wrist object 216 that was added to the arm module 206. As such, an override (e.g., a new override) is added to the body module 220. This particular override effectively deletes the wrist object 216 that was added to the arm module 206. Accordingly, the override in which the wrist object 216-1 was added to the body module is no longer in conflict, and the corresponding conflict is resolved.

It is understood that, for purposes of illustration, particular examples are described herein with reference to modules such as body module 220 and arm module 206, and objects such as wrist object 216-1. However, embodiments of the present invention are not limited thereto. For example, one skilled in the art will appreciate that features described herein with reference to particular modules may similarly apply to other types of modules, including a module that is defined to include one or more submodules. Also, one skilled in the art will appreciate that features described herein with reference to particular objects may similarly apply to other types of objects, such as other parts of a body of a character, facial features of the character, etc.

Returning to the option "Take body's wrist—however, in this situation, additional conflicts may remain. For example, apart from inclusion of the wrist object 216/wrist object 216-1 in the arm module 206/body module 220, there may be conflicts between attribute values of the wrist object 216 and of the wrist object 216-1. As described earlier, values of attributes of the wrist object 216 were defined independently from values of attributes of the wrist object 216-1. If one or more conflicts remain (e.g., with respect to values of attributes), the indicator 306 continues to be displayed at the user interface 400.

For example, conflicts may remain because there is a conflict between the value of the Elasticity attribute 211-1 of the wrist object 216-1 (High, see, e.g., FIG. 2C) and the value of the Elasticity attribute 211 of the wrist object 216 (Low, see, e.g., FIG. 2D). Also, there is a conflict between the value of the Offset attribute 213-1 of the wrist object 216-1 (32, see, e.g., FIG. 2C) and the value of the Offset attribute 213 of the wrist object 216 (8, see, e.g., FIG. 2D).

Figure 4B:
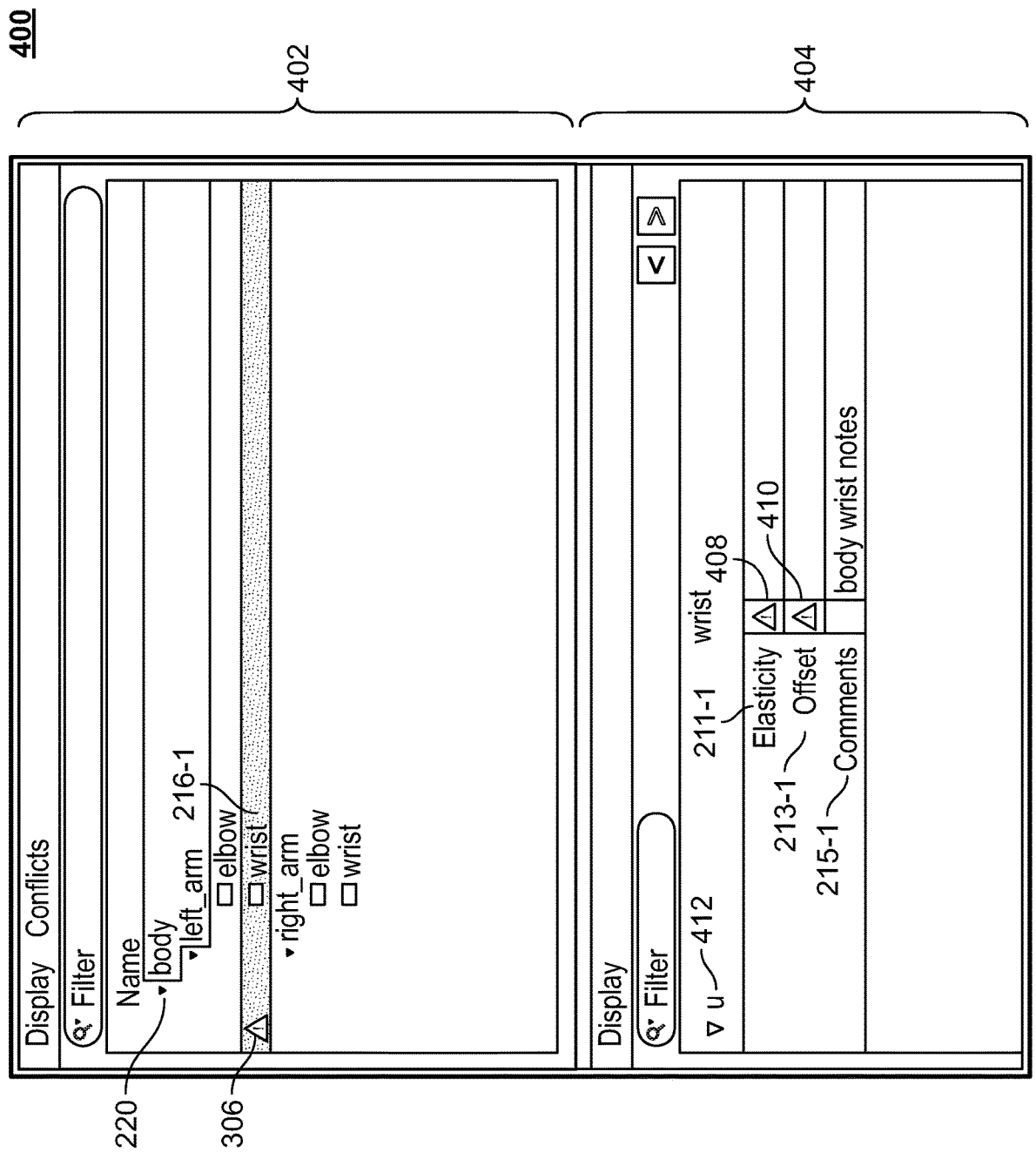

FIG. 4B illustrates a further example of the user interface 400. The display area 404 does not display the conflicting values of the Elasticity attribute 211-1 and the Offset attribute 213-1. According to various embodiments, however, each attribute having a conflict is marked with a corresponding indicator. For example, the Elasticity attribute 211-1 is marked with an indicator 408. As another example, the Offset attribute 213-1 is marked with an indicator 410. Regarding the value of the Comments attribute 215-1 ("body wrist notes"), a Comments attribute was not defined in the wrist object 216 (see, e.g., FIG. 2D). Therefore, with respect to the Comments attribute 215-1, no conflict is present, and the value of the Comments attribute 215-1 is displayed at the display area 404.

Further, the display area 404 may display an additional indicator 412. Regarding the wrist object 216-1, the indicator 412 indicates that the wrist object 216-1 is an updated wrist instance in which an override has occurred. More specifically, in the override of the submodule by the larger module (e.g., of the arm module 206 by the body module 220), the wrist object 216 that was added to the arm module 206 has been deleted, and the wrist object 216-1 that was added to the body module 220 is maintained.

According to various embodiments—to resolve conflicts between the attribute values, one or more options for resolving each conflict are presented to the user via the user interface. The options may be displayed at one or more display areas of the user interface.

Figure 4C:
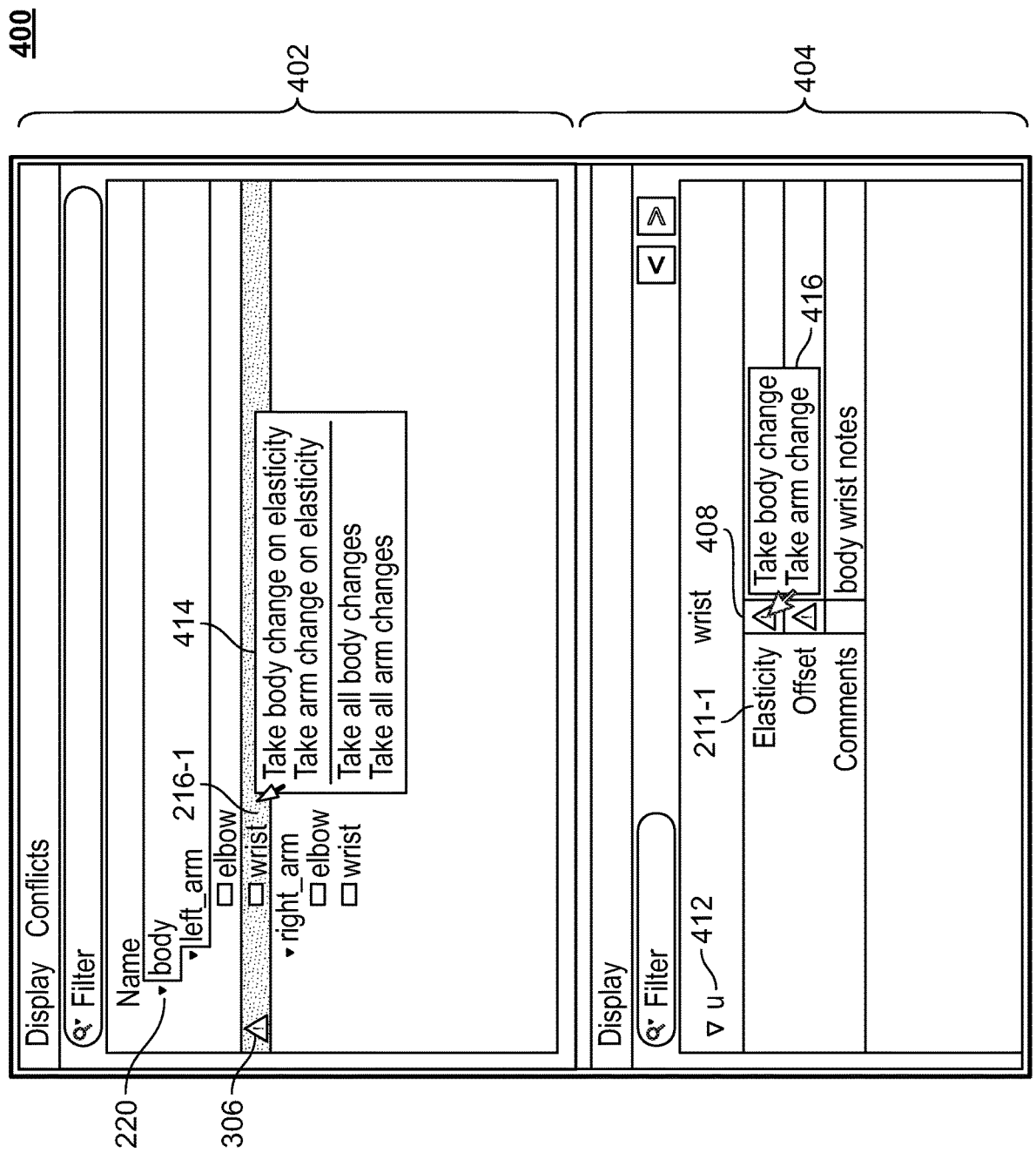

For example, FIG. 4C illustrates a further example of the user interface 400. As will be described in further detail with reference to FIG. 4C, one or more options may be displayed in the display area 402. Alternatively (or in addition), one or more options may be displayed in the display area 404 (see, e.g., menu 416).

If the user selects the display area 402 via the user interface 400 (e.g., by right-clicking at a location within the display area 402), a menu 414 is displayed at the display area 402. The menu 414 lists two options for resolving conflicts on an individual basis: "Take body change on elasticity" and "Take arm change on elasticity." The menu 414 also lists two options for resolving conflicts recursively (or concurrently): "Take all body changes" and "Take all arm changes." Each of these four options is selectable by the user. The two options for resolving conflicts on an individual basis will now be described in more detail. (The two options for resolving conflicts recursively will be described in more detail later, with reference to FIGS. 5A and 5B.)

Figure 4D:
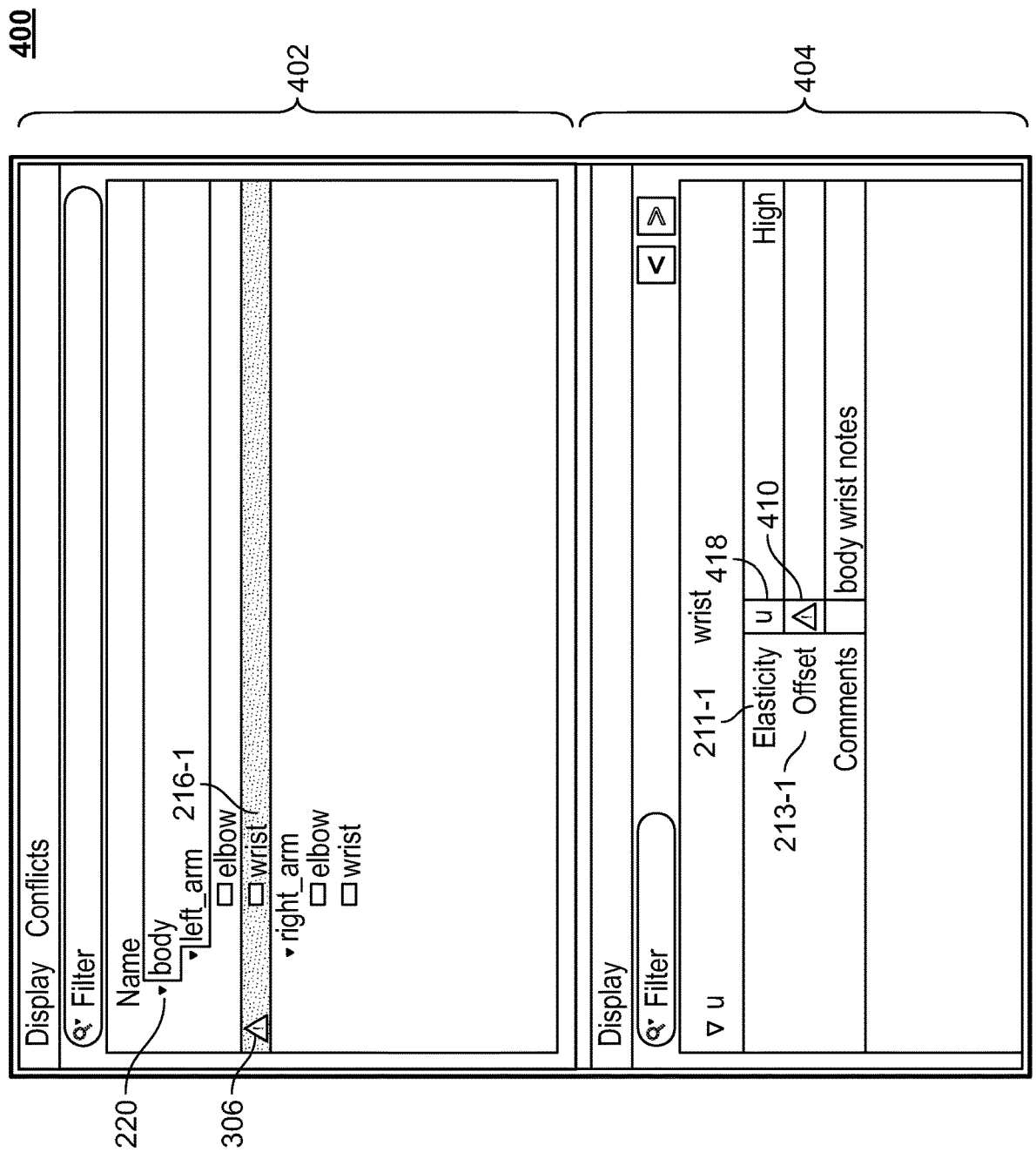

If the option "Take body change on elasticity" is selected, then the value of the Elasticity attribute 211-1 (i.e., High) is adopted. (Alternatively, if the option "Take arm change on elasticity" is selected, then the value of the Elasticity attribute 211 (i.e., Low) is adopted.) For example, FIG. 4D illustrates a further example of the user interface 400. With reference to FIGS. 4C and 4D, in response to selection of the option "Take body change on elasticity," the value of High is displayed at the display area 404. The display area 404 may further display an indicator 418. The indicator 418 indicates that an override of the value of the Elasticity attribute 211 as set in the arm module 206 has occurred. As such, the conflict in the value of the Elasticity attribute 211-1 is resolved.

As previously described regarding the display area 402, options for resolving conflicts on an individual basis are presented. Apart from the conflict in the values of the Elasticity attribute, one other conflict remains to be resolved. Therefore, the display area 402 maintains display of the indicator 306. Furthermore, the display area 404 maintains display of the indicator 410 (see, e.g., FIG. 4D) adjacent to the Offset attribute 213-1.

Figure 4E:
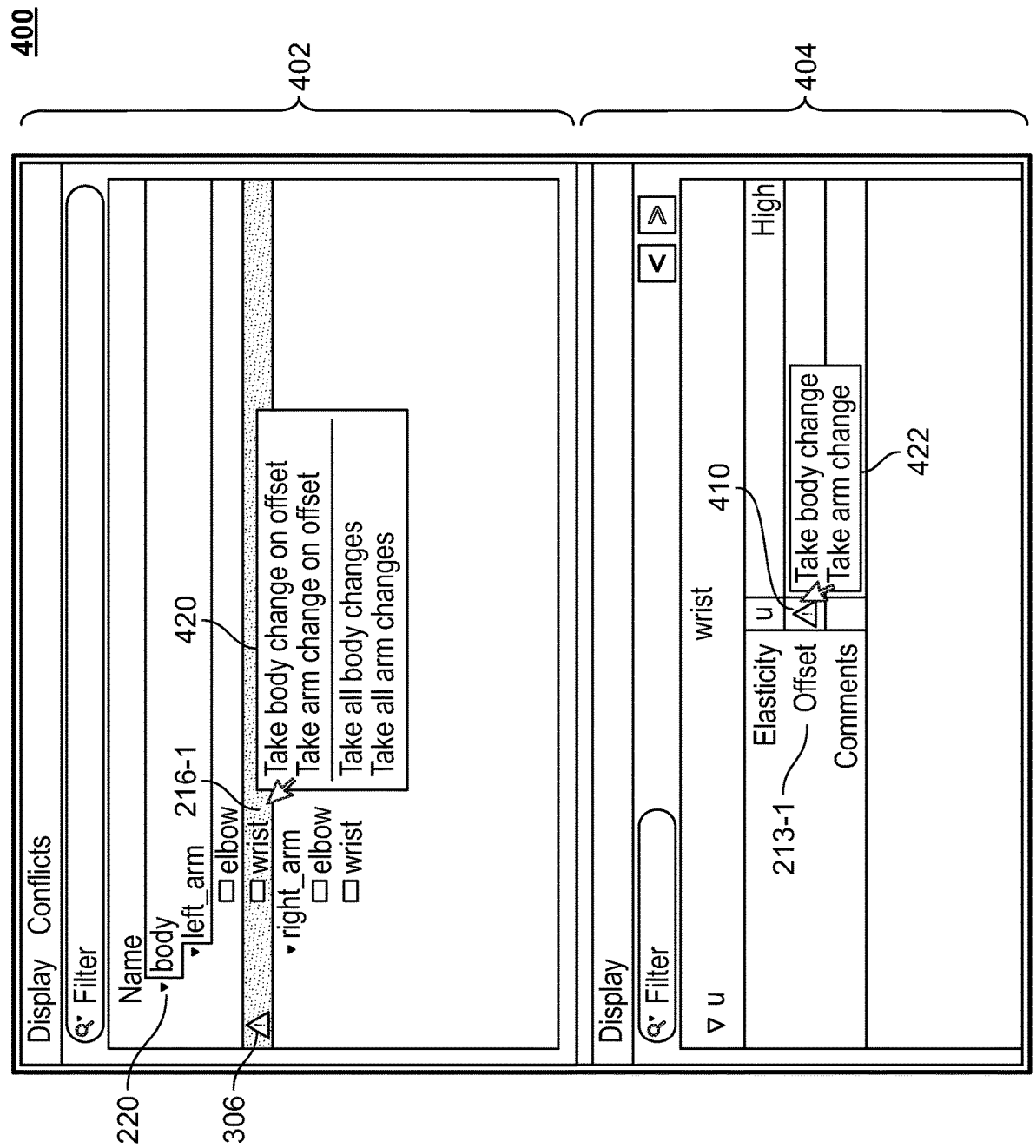

FIG. 4E illustrates a further example of the user interface 400. As will be described in further detail with reference to FIG. 4E, one or more options for resolving the remaining conflict may be displayed in the display area 402. Alternatively (or in addition), one or more options may be displayed in the display area 404 (see, e.g., menu 422).

If the user selects the display area 402 via the user interface 400 (e.g., by right-clicking at a location within the display area 402), a menu 420 is displayed at the display area 402. The menu 420 lists two options for resolving conflicts on an individual basis: "Take body change on offset" and "Take arm change on offset." Each of these options is selectable by the user. (As described earlier with reference to FIG. 4C, two options for resolving conflicts recursively (i.e., "Take all body changes," "Take all arm changes") will be described in more detail later, with reference to FIGS. 5A and 5B.)

Figure 4F:
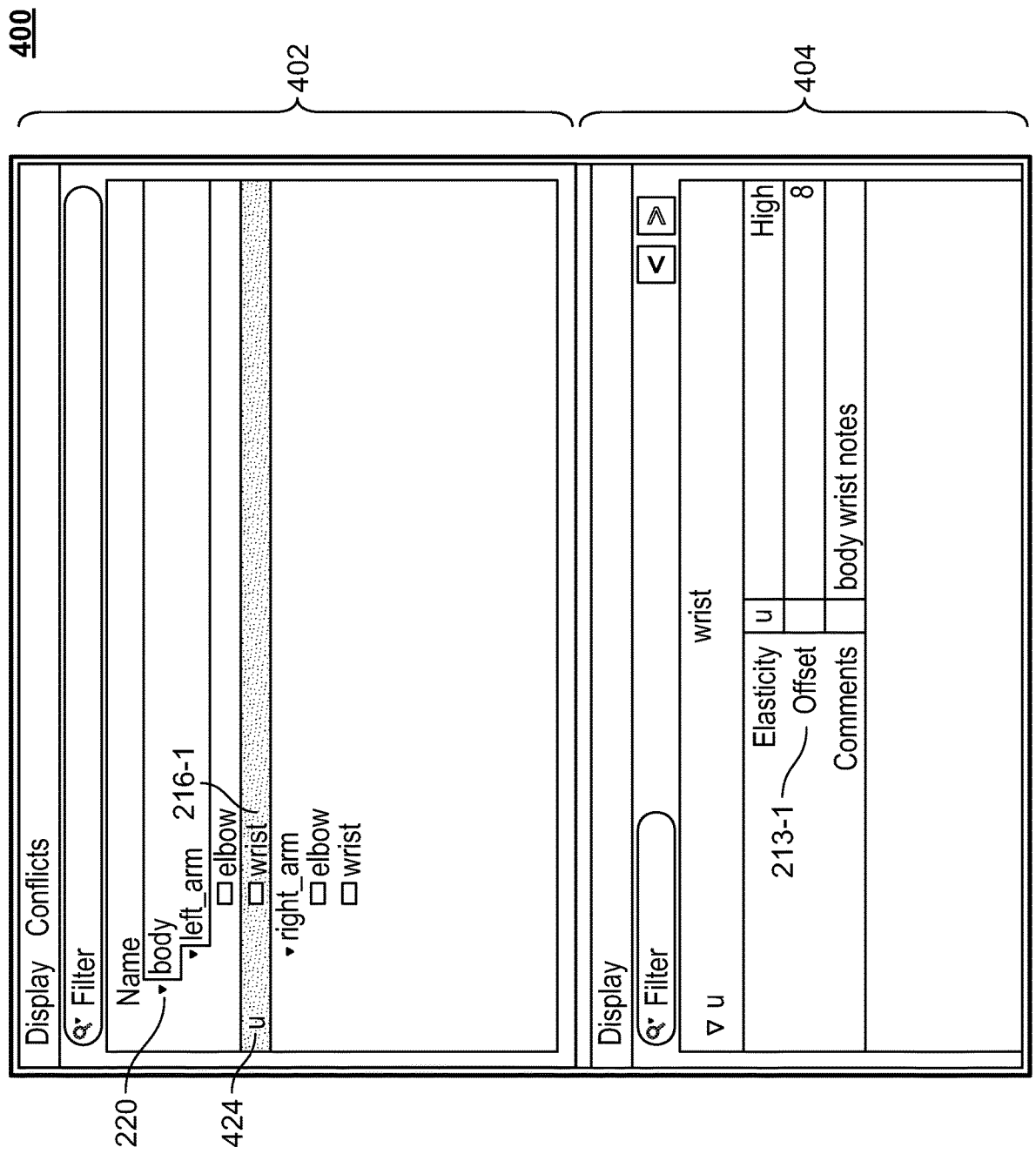

If the option "Take arm change on offset" is selected, then the value of the Offset attribute 213 (i.e., 8) is adopted. (Alternatively, if the option "Take body change on offset" is selected, then the value of the Offset attribute 213-1 (i.e., 32) is adopted.) For example, FIG. 4F illustrates a further example of the user interface 400. With reference to FIGS. 4E and 4F, in response to selection of the option "Take arm change on offset" the value of 8 is displayed at the display area 404. As such, the conflict in the value of the Offset attribute 213-1 is resolved. In contrast to the example of FIG. 4D, the display area 404 in the example of FIG. 4F does not further display an indicator akin to the indicator 418. This is because an override of the value of the Offset attribute 213 as set in the arm module 206 cannot be said to have occurred. Rather, in selecting the option "Take arm change on offset," any overrides to the submodule by the larger module (e.g., to the arm module 206 by the body module 220) are precluded, with respect to the Offset attribute.

Accordingly, all conflicts have been resolved. As such, the display area 402 in the example of FIG. 4F no longer displays the indicator 306. Instead, the display area 402 may display an indicator 424. The indicator 424 indicates the existence, in the body module 220 (more particularly, the wrist object 216-1)), of at least one override with respect to contents of another data module (e.g., arm module 206).

The selection of alternative options for resolving conflicts will now be described with reference back to FIG. 4B. As was described with reference to FIG. 4B, each attribute having a conflict is marked with a corresponding indicator. For example, the Elasticity attribute 211-1 is marked with an indicator 408. As another example, the Offset attribute 213-1 is marked with an indicator 410.

Figure 5A:
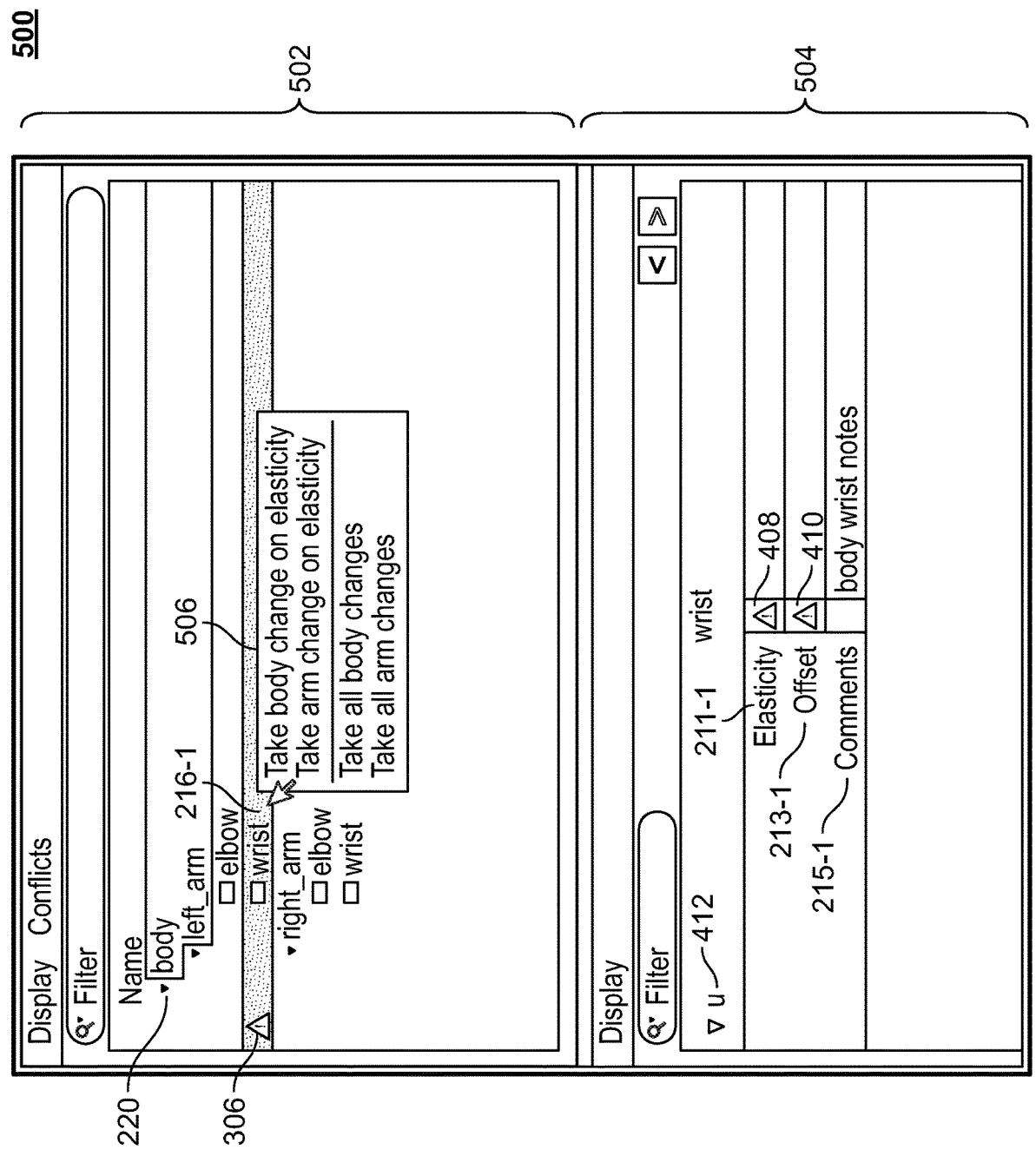
FIGS. 5A and 5B illustrate examples of a user interface according to at least one embodiment.

FIG. 5A illustrates an example of a user interface 500 having display areas 502 and 504. If the user selects the display area 502 via the user interface 500 (e.g., by right-clicking at a location within the display area 502), a menu 506 is displayed at the display area 502. The menu 506 lists two options for resolving two or more conflicts recursively: "Take all body changes" and "Take all arm changes." Each of these options is selectable by the user.

Figure 5B:
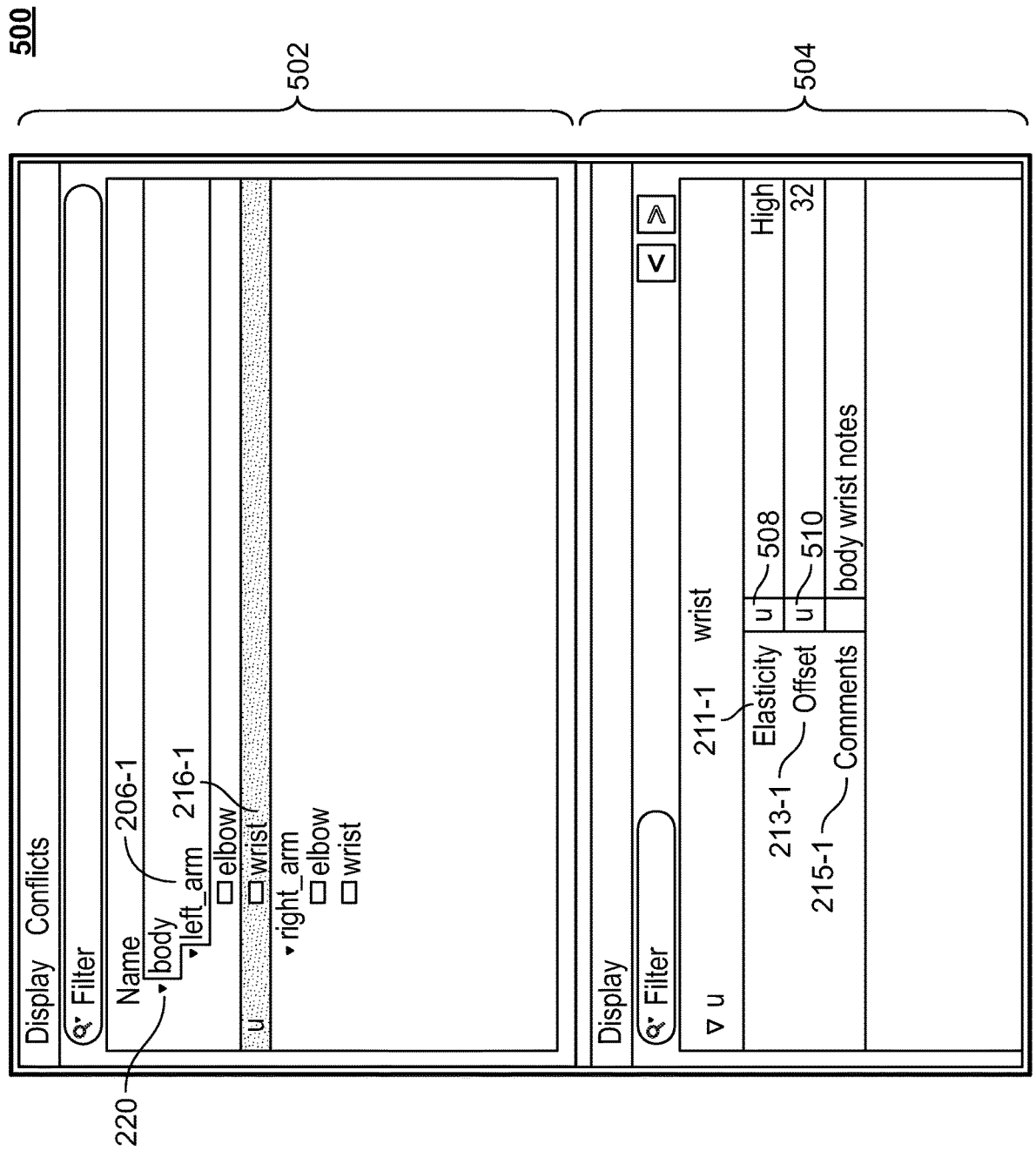

If the option "Take all body changes" is selected, then the value of the Elasticity attribute 211-1 (i.e., High) and the value of the Offset attribute 213-1 (i.e., 32) are adopted. (Alternatively, if the option "Take all arm changes" is selected, then the value of the Elasticity attribute 211 (i.e., Low) and the value of the Offset attribute 213 (i.e., 8) are adopted.) For example, FIG. 5B illustrates a further example of the user interface 400. With reference to FIGS. 5A and 5B, in response to selection of the option "Take all body changes," the value of High and the value of 32 are displayed at the display area 504. The display area 404 may further display indicators 508 and 510. The indicator 508 indicates that an override of the value of the Elasticity attribute 211 as set in the arm module 206 has occurred. In a similar manner, the indicator 510 indicates that an override of the value of the Offset attribute 213 as set in the arm module 206 has occurred. As such, the conflicts in the values of the Elasticity and Offset attributes are resolved.

Accordingly, the instance of the wrist object that is associated with the body module is created. That is, the editing of the body module 220 to include the wrist object 216-1 in the instance 206-1 is accepted, and the instance 206-1 does not include the wrist object 216 that was added to the arm module 206. As such, the instance 206-1 includes the wrist object 216-1. Further, the instance 206-1 includes overrides of the Elasticity attribute 211 and the Offset attribute 213 that were defined in the arm module 206. Further, the instance 206-1 includes the value of the Comments attribute 215-1 ("body wrist notes") that was defined in the body module 220.

Accordingly, all conflicts have been resolved. As such, the display area 502 in the example of FIG. 5B no longer displays the indicator 306.

The selection of alternative options for resolving conflicts will now be described with reference to back to FIGS. 3 and 4A. As was described with reference to FIG. 3, the indicator 306 informs the user of a conflict, which is that the wrist object 216 (of the arm module 206) cannot be included in the instance 206-1, because the same object (wrist object 216-1) was added to the instance 206-1.

As was described with reference to FIG. 4A, the menu 406 is displayed at the display area 402. The menu 406 lists two options that are selectable by the user: "Take body's wrist and descendants" and "Take arm's wrist and descendants."

If the user selects the option "Take arm's wrist and descendants" from the menu 406, then the entire wrist object 216-1 as defined in the body module 220 is removed (or deleted). As such, the editing of the body module 220 to include the wrist object 216-1 in the instance 206-1 is deleted, and the instance 206-1 includes the wrist object 216 that was added to the arm module 206. This will be described in more detail with reference to FIG. 6.

Figure 6:
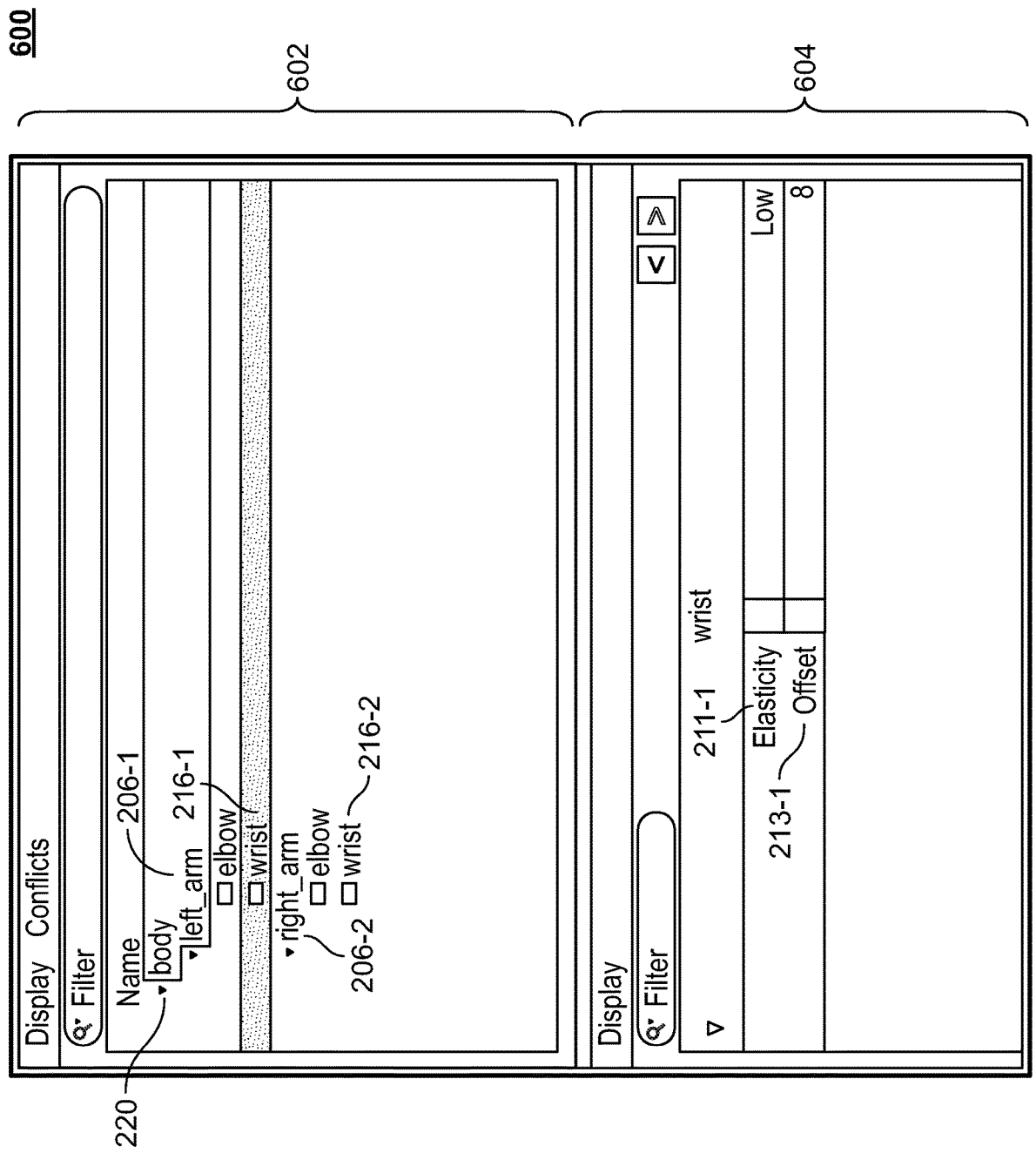
FIG. 6 illustrates an example of a user interface according to at least one embodiment.

FIG. 6 illustrates an example of a user interface 600 having display areas 602 and 604. In response to selection of the option "Take arm's wrist and descendants," all conflicting overrides are removed recursively. In this manner, individual conflicts are successively resolved (e.g., without further input or instruction from the user) until all conflicts have been resolved. As described earlier, descendants may include any attributes of the wrist object 216 defined in association with the arm module 206. As described earlier with reference to FIG. 2A, particular examples are described herein with reference to modules such as body module 220 and arm module 206, and objects such as wrist object 216. However, embodiments of the present invention are not limited thereto. For example, one skilled in the art will appreciate that features described herein with reference to particular modules may similarly apply to other types of modules, including a module that is defined to include one or more submodules. Also, one skilled in the art will appreciate that features described herein with reference to particular objects may similarly apply to other types of objects, such as other parts of a body of a character, facial features of the character, etc.

For example, all conflicts in the values of the Elasticity attribute 211-1 and the Offset attribute 213-1 are resolved in favor of the respective values defined in the arm module 206. With continued reference to FIG. 6, the entire wrist object 216-1 as defined in the body module 220 is removed (or deleted). In contrast, the wrist object 216-1 (that is included, by default, in the instance 206-1) has the attribute values that were defined in the arm module 206 (e.g., Elasticity attribute value of Low, Offset attribute value of 8, etc.) Similarly, the wrist object 216-2 in the instance 206-2 also has these attribute values. As there is no override operation on the wrist object 216-1 or on any of its attributes, an indicator akin to the indicator 412 of FIG. 4C is not displayed at the user interface 600. For example, in the display area 602, an indicator similar to the indicator 424 of FIG. 4F is not displayed. In the display area 604, indicators similar to the indicators 508 and 510 of FIG. 5B are not displayed. The non-appearance of such indicators effectively informs the user that overrides of the values of attributes as set in the arm module 206 cannot be said to have occurred. Accordingly, the values defined in the arm module 206 are adopted. As such, the conflicts in the values of the attributes are resolved.

As described earlier with reference to FIG. 2D, a Comments attribute was not defined. As such, a Comments attribute remains undefined for the wrist object 216-1, and no value of a Comments attribute is displayed at the display area 604.

The foregoing description provided a hierarchical method for resolving conflicts in overrides. For example, if there are conflicts between objects of an instance and objects of a module (e.g., elbow of an arm instance and elbow of an arm module) and between attributes of conflicting objects (e.g., conflicting Elasticity or Offset attributes of the elbow from the arm instance and from the arm module), the order in which the conflicts are displayed for resolution may be determined, and the order may depend on the hierarchical position of conflicts. The conflict that is higher in the hierarchy (e.g., an instance/module conflict) may be determined and subsequently presented for resolution first while conflicts lower in the hierarchy may be initially hidden and presented for resolution after the higher level conflicts have been resolved. According to this method, a position of a conflict within a hierarchy may be determined in relation to the associated overrides. For example, a first conflict may arise from a first override associated with a module and an instance. A second conflict may arise from a second override associated with an object in the module and an object in the instance. In this example, the first conflict will have a higher position in the hierarchy than the second conflict because the first override pertains to features that have a higher hierarchical position relative to the features of the second override. As such, the first conflict will be displayed for resolution while the second conflict may remain hidden until the first conflict is resolved.

Figure 7:
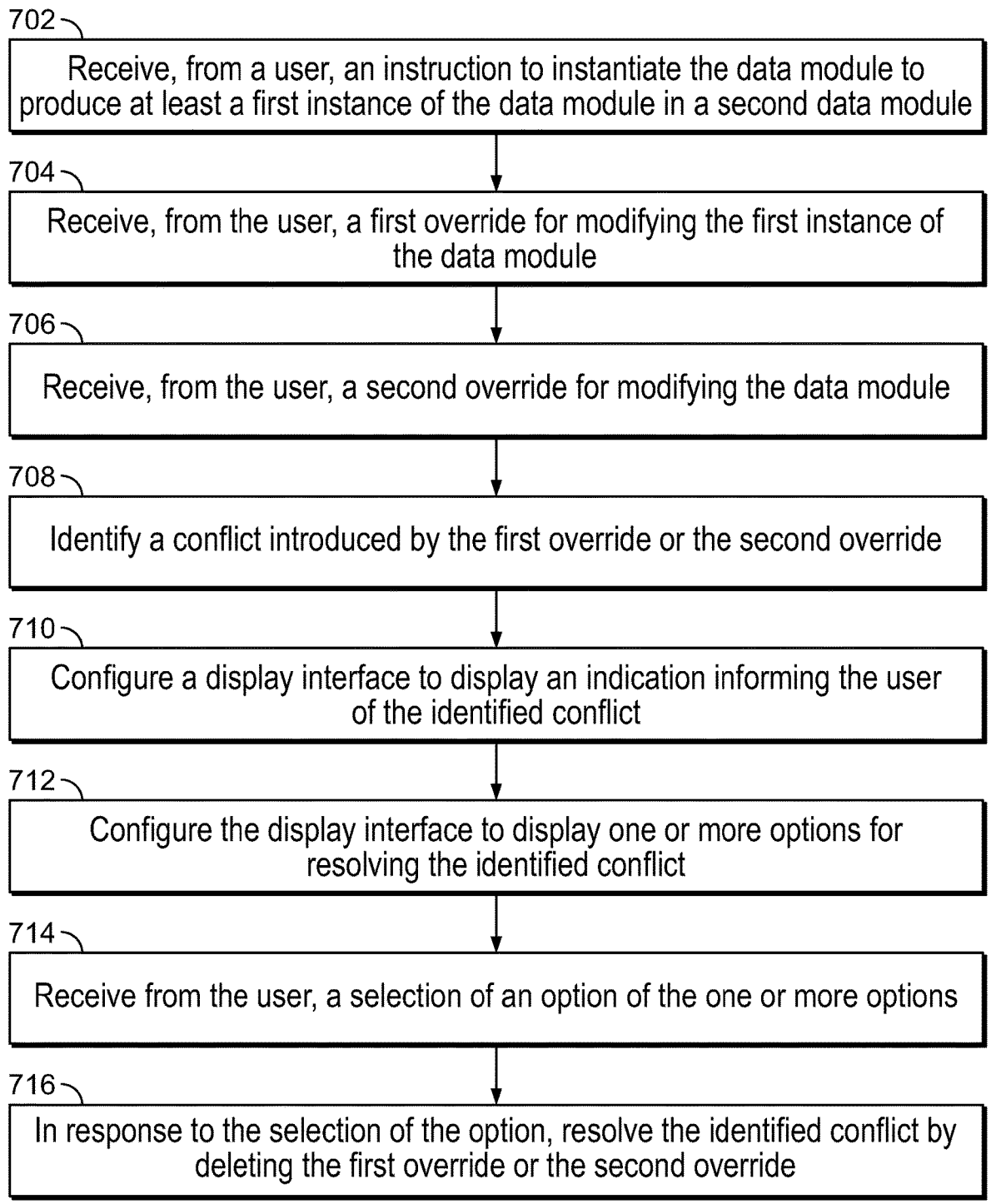
FIG. 7 is a flowchart illustrating a method for composing a scene using a data module according to at least one embodiment.

FIG. 7 illustrates a flowchart of a method 700 of composing a scene using a data module according to at least one embodiment.

At block 702, an instruction is received from a user. The instruction is to instantiate the data module to produce at least a first instance of the data module in a second data module. For example, with reference back to FIG. 2B, the instance 206-1 of the arm module 206 (e.g., the data module) is produced in the body module 220 (e.g., the second data module).

At block 704, a first override is received from the user. The first override is for modifying the first instance of the data module. For example, with reference back to FIG. 2C, the instance 206-1 is modified to include a wrist object 216-1.

The first override may be for modifying a characteristic of the first instance of the data module. For example, the first override may be for modifying contents of the first instance of the data module to include an object in the first instance of the data module.

At block 706, a second override is received from the user. The second override is for modifying the data module. For example, with reference back to FIG. 2D, the arm module 206 is modified to include a wrist object 216.

The second override may be for modifying the same characteristic of the data module. For example, the second override may be for modifying contents of the data module to include the same object in the data module.

At block 708, a conflict introduced by the first override or the second override is identified. For example, as described earlier, the editing of the arm module 206 to also include a wrist object 216 (see, e.g., FIG. 2D) introduces a conflict, in that the changes to the arm module 206 are, by default, included in any instances of the arm module 206 (e.g., the instances 206-1 and 206-2 of FIG. 2B) in the body module 220. However, the same object (i.e., wrist object 216-1) was added to the body module 220 (see, e.g., FIG. 2C). When the same object (i.e., wrist object 216) is added to the arm module 206, and this addition is included (or attempted to be included) in the instance 206-1, a conflict arises. Such a conflict is identified.

For example, identifying the conflict introduced by the first override or the second override may include identifying that the same object (e.g., a wrist object) is added to the first instance of the data module and to the data module. In this regard, the detection and/or identification of the conflict may be based on a matching of object names (e.g., "wrist object"). For example, if an object that is identified (e.g., named) as "wrist object" is requested to be added to the arm module, then a conflict is detected because both the body module and the arm module are attempting to add an object that is identified as "wrist object."

Alternatively (or in addition), the detection and/or identification may be based on a matching of unique identifiers (IDs) that allow objects to be identified, even after an object is renamed. For example, a particular object may not be created (e.g., "from scratch"), but instead may be copied (e.g., from one module to another module). If the unique ID of the object is also copied, then the ID of the object remains associated with the object, even if the name of the object is modified at a later time.

It is understood that detection of conflicts may be based on aspects other than identifiers. For example, identifying the conflict introduced by the first override or the second override may include identifying a mismatch between an attribute value (e.g., Elasticity attribute value, Offset attribute value) of the object added to the first instance of the data module and a corresponding attribute value of the same object added to the data module.

As another example, a particular implementation may require that a scene include no more than one object having an Elasticity attribute of Low. If editing a module results in a scene having at least two objects having an Elasticity attribute of Low, then a conflict may be detected At block 710, a display interface is configured to display an indication informing the user of the identified conflict. For example, with reference back to FIG. 3, an indicator 306 is displayed at the display area 302, adjacent to the wrist object 216-1 of the instance 206-1.

At block 712, the display interface is configured to display one or more options for resolving the identified conflict. For example, with reference back to FIG. 4A, the menu 406 is displayed at the display area 402. The menu 406 lists four options that are selectable by the user: "Take body's wrist," "Take arm's wrist," "Take body's wrist and descendants," and "Take arm's wrist and descendants."

By further way of example—if the option "Take body's wrist" is selected, then configuring the display interface to display the one or more options may include at least configuring the display interface to display a first option (e.g., option "Take body change on elasticity" or option "Take arm change on elasticity" of FIG. 5A) for resolving the identified conflict on an individual basis, or configuring the display interface to display a second option (e.g., option "Take all body changes" or option "Take all arm changes" of FIG. 5A) for recursively resolving the identified conflict together with at least one other identified conflict.

The four options listed in the menu 406 represent an example of a set of resolution options, which can be described more generally as involving adopting an edit associated with a larger module, accepting an edit associated with an instance, adopting the edit associated with the larger module and corresponding descendants, and adopting the edit associated with the instance and corresponding descendants. However, embodiments of the present invention are not limited thereto. For example, one skilled in the art will appreciate that strategies involving alternative (or additional) options for resolving conflicts may be implemented. For example—as was described earlier regarding conflict detection, a particular implementation may require that a scene include no more than one object having an Elasticity attribute of Low. If editing a module results in the scene having at least two objects having an Elasticity attribute of Low, then a conflict may be detected. In such a situation, the options for resolving the detected conflict may include: setting the Elasticity attribute of each and every object in the scene to be High, and setting the Elasticity of all but one object in the scene to be High. As such, the requirement that the scene include no more than one object having an Elasticity attribute of Low is satisfied.

At block 714, a selection of an option of the one or more options is received from the user. For example, with reference to FIG. 5B, a selection of the option "Take all body changes" is received.

At block 716, in response to the selection of the option, the identified conflict is resolved by deleting the first override or the second override. For example, with reference to FIG. 5B, the value of the Elasticity attribute 211-1 (i.e., High) and the value of the Offset attribute 213-1 (i.e., 32) are adopted. Indicators 508 and 510 are displayed. The indicator 508 indicates that an override of the value of the Elasticity attribute 211 as set in the arm module 206 has occurred. As such, the editing of the value of the Elasticity attribute 211 in the arm module 206 is deleted. In a similar manner, the indicator 510 indicates that an override of the value of the Offset attribute 213 as set in the arm module 206 has occurred. As such, the editing of the value of the Offset attribute 213 in the arm module 206 is deleted.

Deleting the first override or the second override may effectively restrict data modules from accessing the deleted override downstream. Further, deleting the first override or the second override may prevent the deleted override from being revived by data modules. Accordingly, deleted overrides provide an encapsulation and data privacy technique that may prevent unwanted data from being revived downstream. This allows a user (e.g., an animation artist) to better control the lifetime of particular data. For example, as described earlier with reference to FIG. 4A—if the user selects the option "Take body's wrist" from the menu 406, then the wrist object 216-1 as was defined in association with the body module 220 is created. As such, an override (e.g., a new override) is added to the body module 220. This particular override effectively deletes the wrist object 216 that was added to the arm module 206. Instances of the body module 220 that are created downstream will be unable to access the wrist object 216 that was added to the arm module 206. Furthermore, instances of the body module 220 that are created downstream will be unable to revive the wrist object 216 that was added to the arm module 206.

Figure 8:
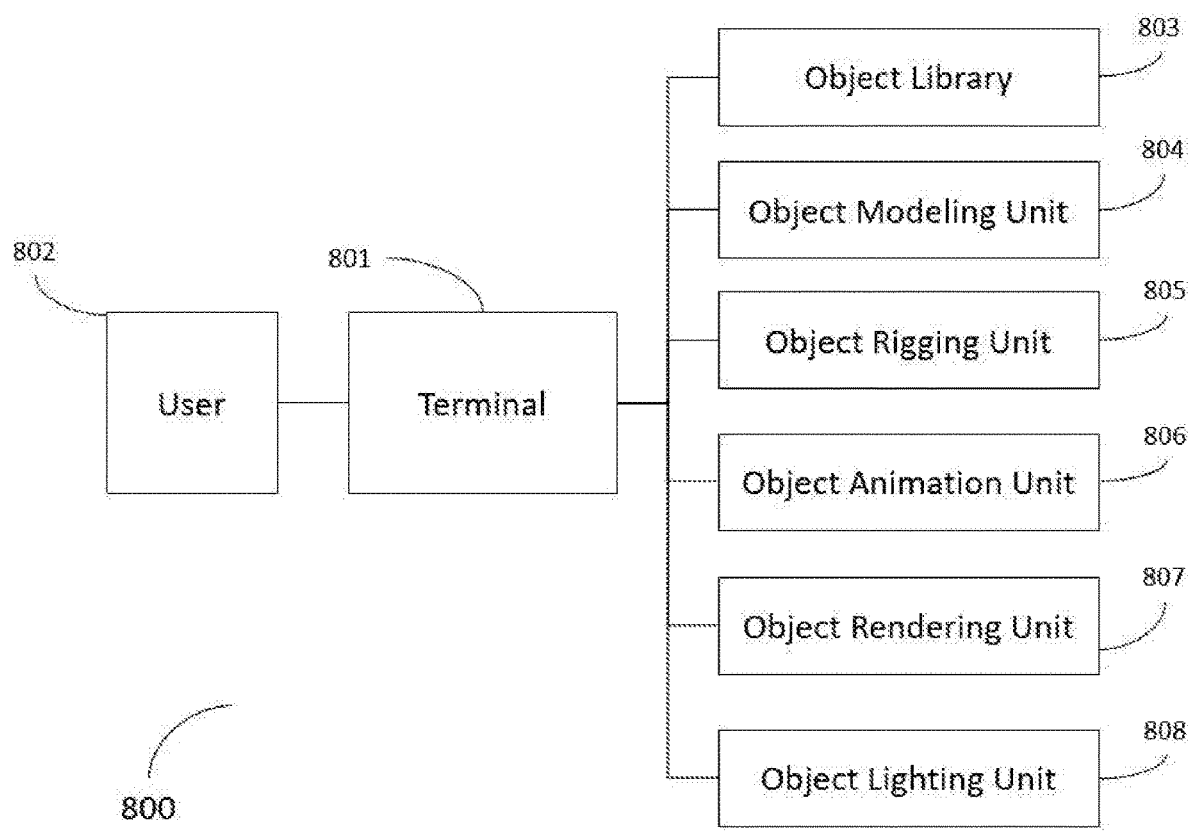
FIG. 8 is an illustration of a computing environment according to at least one embodiment.

Referring now to FIG. 8, a simplified block diagram of a system 800 for creating computer graphics imagery (CGI) and computer-aided animation is shown that may implement or incorporate various embodiments of the present disclosure. The system 800 may include one or more terminals 801. The one or more terminals 801 may include hardware and software elements configured for designing CGI and assisting with computer-aided animation. The terminals 801 may be implemented as a single computing device or a set of one or more computing devices, corresponding to computer hardware and/or software.

Examples of terminals 801 may be desktop computers, laptop computers, workstation computers, mainframes, cluster computing systems, cloud computing terminals, embedded computing devices, computer graphics devices, gaming devices and consoles, video media playback devices, consumer electronic devices having programmable processors, or the like. The one or more terminals 801 may be utilized at various stages of a production process, including pre-production, modeling, designing, creating, editing, simulating, animating, rendering, post-production, finishing, publishing, and the like, to produce recordings, computer files, tangible materials, and the like, related to or comprising images, image sequences, motion pictures, video, audio, or associated effects related to CGI and animation.

In an example of system 800, a user 802 may utilize the one or more terminals 1101 to design, create, or modify objects within a computer-generated interface displayed on display associated with the terminal 801.

The terminal may implement, include, or otherwise be in operable communication with, systems and units including object library 803, object modeling unit 804, object rigging unit 805, object animation unit 806, object rendering unit 807, and object lighting unit 808. Object library 803 may include software and/or hardware elements configured for storing and accessing information related to objects to be accessed, requested, retrieved, and/or used by the one or more terminals 801 to design, create, and modify models (e.g., 3D models) of objects in the CGI and animation processes.

Object modeling unit 804 may include software and/or hardware elements and information to be accessed, requested, retrieved, and/or used by the one or more terminals 801 to sculpt and design the 3D model to take on the desired appearance as instructed by user 802, or other terminal operator during the CGI and animation process.

Object rigging unit 805 may include software and/or hardware elements and information to be accessed, requested, retrieved, and/or used by the one or more terminals 801 to design, create, or modify components of 3D models to define articulation points and movement ranges of various elements of the 3D model.

Object animation unit 806 may include software and/or hardware elements and information to be accessed, requested, retrieved, and/or used by the one or more terminals 801 to design, create, or modify animation aspects of a 3D model, including specifying the motion and position of various elements of the 3D model over time during the animation, such as specifying animation paths, cues, or the like or generating key frames or intermediary frames for animated motion of the 3D model.

Object rendering unit 807 may include software and/or hardware elements and information to be accessed, requested, retrieved, and/or used by the one or more terminals 801 to design, create, or modify a final appearance of the animated 3D model, including generating one or more images of one or more computer-generated objects, including textures, colors, rigging, controls, and the like.

Object lighting unit 808 may include software and/or hardware elements and information to be accessed, requested, retrieved, and/or used by the one or more terminals 801 to design, create, or modify lighting aspects of a 3D model and animated scenes, including defining lighting sources, shading, reflections, refractions, textures, colors, and the like.

The one or more terminals 801 may be in communication with one or more server computers which may operatively be in communication with one or more data stores (e.g., databases, indexes, files, or other data structures). The one or more server computers may connect to a data communication network comprising a local area network (LAN), a wide area network (WAN) (e.g., the Internet), a telephone network, a satellite or wireless communication network, or some combination of these or similar networks.

In selected embodiments, the one or more server computers may implement one or more processes, systems, or units of the animation system, including object library 803, object modeling unit 804, object rigging unit 805, object animation unit 806, object rendering unit 807, object lighting unit 808, and the like. The one or more terminals 801, the one or more server computers, or any other aspect of the system 800, may be associated or coupled with a display configured to display information, including a displayed interface for displaying, performing, executing, instructing, reviewing, and/or selecting operations of the present disclosure.

Figure 9:
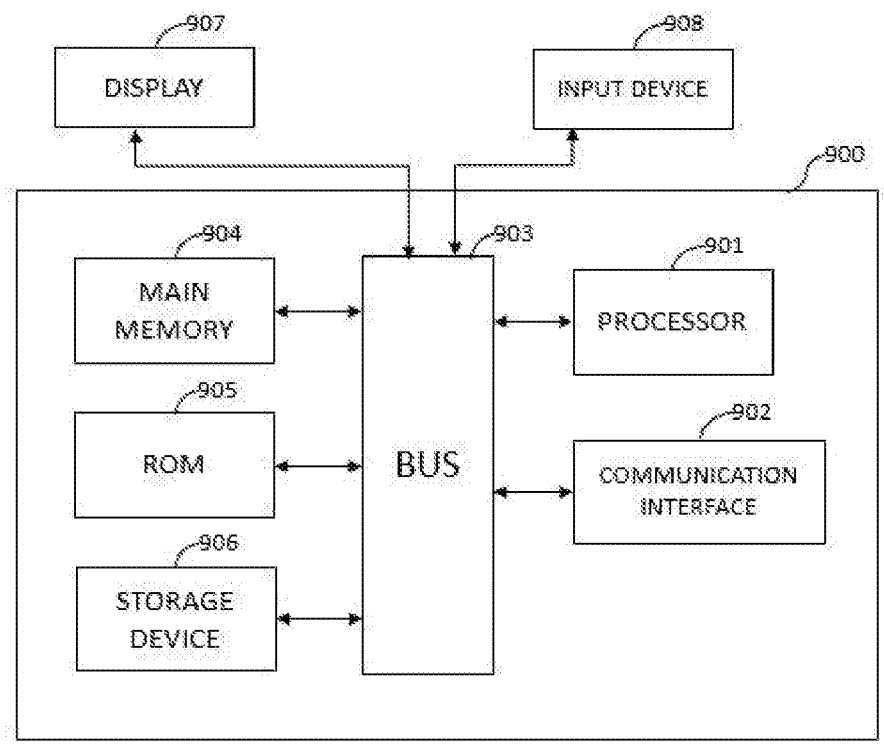
FIG. 9 is a block diagram of a device according to at least one embodiment.

Referring to FIG. 9, an illustration of an example computer 900 is provided. One or more of aspects of the system 800 discussed above in FIG. 8, such as the one or more terminals 801 or the one or more server computers, may be configured as or include such a computer 900. In selected embodiments, the computer 900 may include a bus 903 (or multiple buses) or other communication mechanism, a processor 901, main memory 904, read only memory (ROM) 905, one or more additional storage devices 906, and/or a communication interface 902, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 903 or other communication mechanism, including multiple such buses or mechanisms, may support communication of information within the computer 900. The processor 901 may be connected to the bus 903 and process information. In selected embodiments, the processor 901 may be a specialized or dedicated microprocessor configured to perform particular tasks in accordance with the features and aspects disclosed herein by executing machine-readable software code defining the particular tasks. Main memory 904 (e.g., random access memory—or RAM—or other dynamic storage device) may be connected to the bus 903 and store information and instructions to be executed by the processor 901. Main memory 904 may also store temporary variables or other intermediate information during execution of such instructions.

ROM 905 or some other static storage device may be connected to a bus 903 and store static information and instructions for the processor 901. An additional storage device 906 (e.g., a magnetic disk, optical disk, memory card, or the like) may be connected to the bus 903. The main memory 904, ROM 905, and the additional storage device 906 may include a non-transitory computer-readable medium holding information, instructions, or some combination thereof, for example instructions that when executed by the processor 901, cause the computer 900 to perform one or more operations of a method as described herein. A communication interface 902 may also be connected to the bus 903. A communication interface 902 may provide or support two-way data communication between a computer 900 and one or more external devices (e.g., other devices contained within the computing environment).

In selected embodiments, the computer 900 may be connected (e.g., via a bus) to a display 907. The display 907 may use any suitable mechanism to communicate information to a user of a computer 900. For example, the display 907 may include or utilize a liquid crystal display (LCD), light emitting diode (LED) display, projector, or other display device to present information to a user of the computer 900 in a visual display. One or more input devices 908 (e.g., an alphanumeric keyboard, mouse, microphone, stylus pen) may be connected to the bus 903 to communicate information and commands to the computer 900. In selected embodiments, one input device 908 may provide or support control over the positioning of a cursor to allow for selection and execution of various objects, files, programs, and the like provided by the computer 900 and displayed by the display 907.

The computer 900 may be used to transmit, receive, decode, display, or the like one or more video files. In selected embodiments, such transmitting, receiving, decoding, and displaying may be in response to the processor 901 executing one or more sequences of one or more instructions contained in main memory 904. Such instructions may be read into main memory 904 from another non-transitory computer-readable medium (e.g., a storage device).

Execution of sequences of instructions contained in main memory 904 may cause the processor 901 to perform one or more of the procedures or steps described herein. In selected embodiments, one or more processors in a multi-processing arrangement may also be employed to execute sequences of instructions contained in main memory 904. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 901, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 902 may provide or support external, two-way data communication to or via a network link. For example, a communication interface 902 may be a wireless network interface controller or a cellular radio providing a data communication network connection. Alternatively, a communication interface 902 may comprise a local area network (LAN) card providing a data communication connection to a compatible LAN. In any such embodiment, a communication interface 902 may send and receive electrical, electromagnetic, or optical signals conveying information.

A network link may provide data communication through one or more networks to other data devices (e.g., one or more terminals 801 as shown in the system 800). For example, a network link may provide a connection through a local network of a host computer or to data equipment operated by an Internet Service Provider (ISP). An ISP may, in turn, provide data communication services through the Internet. Accordingly, a computer 900 may send and receive commands, data, or combinations thereof, including program code, through one or more networks, a network link, and communication interface 902. Thus, the computer 900 may interface or otherwise communicate with a remote server, or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A computer-implemented method for composing a scene using a data module, the method comprising:
    receiving, from a user, an instruction to instantiate the data module to produce at least a first instance of the data module in a second data module;
    receiving, from the user, a first override for modifying the first instance of the data module;
    receiving, from the user, a second override for modifying the data module;
    identifying a conflict introduced by the first override and the second override;
    configuring a display interface to display an indication informing the user of the identified conflict;
    configuring the display interface to display one or more options for resolving the identified conflict;
    receiving, from the user, a selection of an option of the one or more options; and
    in response to the selection of the option, resolving the identified conflict by deleting the first override or the second override.

2. The method of claim 1, wherein:
    the first override is for modifying a characteristic of the first instance of the data module; and
    the second override is for modifying the same characteristic of the data module.

3. The method of claim 2, wherein:
the first override is for modifying contents of the first instance of the data module by adding an object to the first instance of the data module; and
the second override is for modifying contents of the data module by adding the same object to the data module.

4. The method of claim 3, wherein identifying the conflict introduced by the first override and the second override comprises identifying that the same object is added to the first instance of the data module and to the data module.

5. The method of claim 3, wherein identifying the conflict introduced by the first override and the second override comprises identifying a mismatch between an attribute value of the object added to the first instance of the data module and a corresponding attribute value of the same object added to the data module.

6. The method of claim 1, wherein configuring the display interface to display the one or more options comprises at least:
configuring the display interface to display a first option for resolving the identified conflict on an individual basis; or
configuring the display interface to display a second option for concurrently resolving the identified conflict together with at least one other identified conflict.

7. The method of claim 1, wherein deleting the first override or deleting the second override effectively restricts the user or a downstream user from accessing the deleted override.

8. The method of claim 1, wherein deleting the first override or deleting the second override prevents the first override or the second override from being revived by the user or a downstream user.

9. A machine-readable non-transitory medium having stored thereon machine-executable instructions for composing a scene using a data module, the instructions comprising:
receiving, from a user, an instruction to instantiate the data module to produce at least a first instance of the data module in a second data module;
receiving, from the user, a first override for modifying the first instance of the data module;
receiving, from the user, a second override for modifying the data module;
identifying a conflict introduced by the first override and the second override;
configuring a display interface to display an indication informing the user of the identified conflict;
configuring the display interface to display one or more options for resolving the identified conflict;
receiving, from the user, a selection of an option of the one or more options; and
in response to the selection of the option, resolving the identified conflict by deleting the first override or the second override.

10. The machine-readable non-transitory medium of claim 9, wherein:
the first override is for modifying a characteristic of the first instance of the data module; and
the second override is for modifying the same characteristic of the data module.

11. The machine-readable non-transitory medium of claim 10, wherein:
the first override is for modifying contents of the first instance of the data module by adding an object to the first instance of the data module; and
the second override is for modifying contents of the data module by adding the same object to the data module.

12. The machine-readable non-transitory medium of claim 11, wherein identifying the conflict introduced by the first override and the second override comprises identifying that the same object is added to the first instance of the data module and to the data module.

13. The machine-readable non-transitory medium of claim 11, wherein identifying the conflict introduced by the first override and the second override comprises identifying a mismatch between an attribute value of the object added to the first instance of the data module and a corresponding attribute value of the same object added to the data module.

14. The machine-readable non-transitory medium of claim 9, wherein configuring the display interface to display the one or more options comprises at least:
configuring the display interface to display a first option for resolving the identified conflict on an individual basis; or
configuring the display interface to display a second option for concurrently resolving the identified conflict together with at least one other identified conflict.

15. The machine-readable non-transitory medium of claim 9, wherein deleting the first override or deleting the second override effectively restricts the user or a downstream user from accessing the deleted override.

16. The machine-readable non-transitory medium of claim 9, wherein deleting the first override or deleting the second override prevents the first override or the second override from being revived by the user or a downstream user.

17. A system for composing a scene using a data module, the system comprising one or more controllers configured to:
receive, from a user, an instruction to instantiate the data module to produce at least a first instance of the data module in a second data module;
receive, from the user, a first override for modifying the first instance of the data module;
receive, from the user, a second override for modifying the data module;
identify a conflict introduced by the first override and the second override;
configure a display interface to display an indication informing the user of the identified conflict;
configure the display interface to display one or more options for resolving the identified conflict;
receive, from the user, a selection of an option of the one or more options; and
in response to the selection of the option, resolving the identified conflict by deleting the first override or the second override.

* * * * *